(12) United States Patent    (10) Patent No.: US 8,937,400 B2
Obayashi et al.    (45) Date of Patent: Jan. 20, 2015

(54) POWER SUPPLY APPARATUS FOR VEHICLE

(75) Inventors: Kazuyoshi Obayashi, Chita-gun (JP); Akira Sakamoto, Obu (JP); Atsuyuki Hiruma, Kariya (JP); Masahito Mizukoshi, Nagoya (JP); Jun Ishii, Okazaki (JP); Mitsuru Fujita, Kuwana (JP)

(73) Assignee: Denso Corporation, Kariya (JP)

( * ) Notice: Subject to any disclaimer, the term of this patent is extended or adjusted under 35 U.S.C. 154(b) by 780 days.

(21) Appl. No.: 13/094,232

(22) Filed: Apr. 26, 2011

(65) Prior Publication Data

US 2011/0260531 A1    Oct. 27, 2011

(30) Foreign Application Priority Data

Apr. 27, 2010 (JP) ................. 2010-101694
Apr. 27, 2010 (JP) ................. 2010-101701
Oct. 26, 2010 (JP) ................. 2010-239339

(51) Int. Cl.
  *B60L 1/00*  (2006.01)
  *B60L 11/14* (2006.01)
  (Continued)

(52) U.S. Cl.
  CPC ............ B60L 11/1816 (2013.01); *B60R 16/03* (2013.01); *Y02T 90/127* (2013.01);
  (Continued)

(58) Field of Classification Search
  CPC . B60R 16/03; B60L 11/1816; B60L 11/1868; B60L 11/14; B60L 2201/10; B60L 2210/40; Y02T 10/7216; Y02T 10/7005; Y02T 10/7077; Y02T 10/7088; Y02T 90/121; Y02T 90/127; Y02T 90/14; Y02T 10/7241; Y02T 10/7066

USPC ............ 307/9.1, 10.1; 318/12, 400.09; 180/65.21; 361/647, 631, 131, 2, 13, 361/189, 190, 249, 628, 268, 643, 632, 621, 361/362, 781, 250, 828, 832, 837
  See application file for complete search history.

(56) References Cited

U.S. PATENT DOCUMENTS 5,670,851 A * 9/1997 Numazaki ................. 318/106
8,810,205 B2   8/2014 Ichikawa
        (Continued)

FOREIGN PATENT DOCUMENTS

EP   2 431 212 A1   3/2012
EP   2 431 214 A1   3/2012
        (Continued)

OTHER PUBLICATIONS

Japanese Office Action issued in Japanese Application No. 2010-280813 dated Nov. 6, 2012 (w/translation).
        (Continued)

*Primary Examiner* — Rexford Barnie
*Assistant Examiner* — Elim Ortiz
(74) *Attorney, Agent, or Firm* — Oliff PLC

(57) ABSTRACT

A power supply apparatus for a vehicle is provided which supplies electric power to a power supply unit and charges electric power from the power supply unit via a power port. The vehicle includes a plurality of power inverter circuits which are connected to a common storage unit in parallel. The plurality of power inverter circuits include an electric power transferring power inverter circuit connected to the power port via an electric power transferring electric path, and are divided into a first category including the electric power transferring power inverter circuit and a second category. The power supply apparatus includes a connection prohibiting unit which realizes a state in which the power inverter circuit included in the first category is electrically connected to the storage unit, and the power inverter circuit included in the second category is disconnected from the storage unit.

22 Claims, 14 Drawing Sheets

(51) Int. Cl.
*B60L 11/18* (2006.01)
*B60R 16/03* (2006.01)

(52) U.S. Cl.
CPC ............. *Y02T 10/7216* (2013.01); *B60L 11/14* (2013.01); *Y02T 10/7077* (2013.01); *Y02T 10/7066* (2013.01); *B60L 2210/40* (2013.01); *Y02T 10/7005* (2013.01); *Y02T 10/7241* (2013.01); *B60L 1/003* (2013.01); *B60L 11/1868* (2013.01); *Y02T 90/121* (2013.01); *Y02T 90/14* (2013.01); *Y02T 10/7088* (2013.01); *B60L 2210/10* (2013.01)
USPC ........ 307/9.1; 307/10.1; 318/12; 318/400.09; 320/137; 180/65.21; 361/190; 361/243; 361/628; 361/643; 361/632; 361/647; 361/131; 361/2; 361/13; 361/189; 361/621; 361/781; 361/250; 361/837; 361/631; 361/828; 361/832

(56) References Cited

U.S. PATENT DOCUMENTS

| | | | |
|---|---|---|---|
| 2002/0024221 A1* | 2/2002 | Grewe et al. | 290/40 C |
| 2004/0041568 A1* | 3/2004 | Yang | 324/426 |
| 2009/0067205 A1 | 3/2009 | Oyobe et al. | |
| 2009/0121659 A1* | 5/2009 | Oyobe et al. | 318/12 |
| 2010/0063660 A1* | 3/2010 | Uchida | 701/22 |
| 2011/0187184 A1 | 8/2011 | Ichikawa | |
| 2012/0306439 A1 | 12/2012 | Ichikawa et al. | |

FOREIGN PATENT DOCUMENTS

| | | |
|---|---|---|
| JP | A-8-308150 | 11/1996 |
| JP | A-9-322412 | 12/1997 |
| JP | A-10-191506 | 7/1998 |
| JP | A-2001-8380 | 1/2001 |
| JP | B2-3477850 | 10/2003 |
| JP | A-2007-097341 | 4/2007 |
| JP | A-2007-195336 | 8/2007 |
| JP | A-2007-318970 | 12/2007 |
| JP | A-2008-172857 A | 7/2008 |
| JP | A-2008-220130 | 9/2008 |
| JP | A-2010-081672 | 4/2010 |
| WO | WO 2009/116311 A1 | 9/2009 |
| WO | WO 2009116311 A1 * | 9/2009 |
| WO | WO 2010/131346 A1 | 11/2010 |
| WO | WO 2010/131348 A1 | 11/2010 |
| WO | WO 2010/131349 A1 | 11/2010 |

OTHER PUBLICATIONS

U.S. Appl. No. 13/328,555, filed Dec. 16, 2011 in the name of Obayashi et al.

Apr. 17, 2012 Notification of Reasons for Rejection issued in Japanese Patent Application No. 2010-101701 (with translation).

Office Action issued in Japanese Application No. 2012-145768 dated Jun. 11, 2013 (with partial translation).

Japanese Office Action issued in Japanese Patent Application No. 2010-280813 dated Jul. 2, 2013 (w/translation).

May 1, 2012 Notification of Reasons for Rejection issued in Japanese Patent Application No. 2010-239339 (with translation).

Office Action dated Feb. 25, 2014 issued in Japanese Patent Application No. 2012-145768 (w/English Translation).

Sep. 12, 2014 Office Action issued in U.S. Appl. No. 13/328,555.

* cited by examiner

< WHEN AUXILIARY UNIT IS DRIVEN >

MAX POWER Pd

Pd<Pc

RATED OUTPUT Rot5
(Rot5<Rot3)

< WHEN CHARGING >

MAX POWER Pc

POWER SUPPLY APPARATUS FOR VEHICLE

CROSS-REFERENCE TO RELATED APPLICATION

This application is based on and claims the benefit of priority from earlier Japanese Patent Applications No. 2010-101694 filed Apr. 27, 2010, No. 2010-239339 filed Oct. 26, 2010, and No. 2010-101701 filed Apr. 27, 2010, the descriptions of which are incorporated herein by reference.

BACKGROUND

1. Technical Field

The present invention relates to a power supply apparatus for a vehicle which supplies electric power to a power supply unit and charges electric power from the power supply unit to a main battery of an electric vehicle, a plug-in hybrid vehicle or a vehicle with electrically driven auxiliary units via a power port.

2. Related Art

This type of power supply apparatus is disclosed in JP-A-2007-318970. This power supply apparatus uses an inverter which is operated to control power applied to drive wheels of a vehicle by a motor generator, thereby storing electric power supplied from an external commercial power source in a battery of the vehicle.

The above inverter is required to have high reliability. Generally, the operation of the inverter should be ensured for a required total period of time during which the vehicle can run. Meanwhile, a long time is generally required to store electric power supplied from an external commercial power source. Hence, when the required total period of time during which a vehicle can run is fixed, required durability of the inverter of a vehicle having a charging function can become excessive compared with that of a vehicle not having a charging function.

In addition, a battery in a vehicle is often connected to an auxiliary unit in addition to the inverter. The auxiliary unit is driven with high voltage by the battery. In this case, standby electric power can be consumed by a drive circuit and the like of the auxiliary unit when charging.

SUMMARY

An embodiment provides a power supply apparatus for a vehicle which can effectively supply electric power to a power supply unit and receive electric power from the power supply unit via a power port.

Another embodiment provides a power supply apparatus for a vehicle which can supply electric power to a power supply unit and receive electric power from the power supply unit via a power port in a state where required durability of a power inverter circuit, which is operated to control power applied to drive wheels by a rotating machine, does not become excessive.

As an aspect of the embodiment, a power supply apparatus for a vehicle is provided which supplies electric power to a power supply unit and charges electric power from the power supply unit to a main battery of an electric vehicle, a plug-in hybrid vehicle or a vehicle with electrically driven auxiliary units via a power port, wherein the vehicle includes a plurality of power inverter circuits which are connected to a common storage unit in parallel, and the plurality of power inverter circuits include an electric power transferring power inverter circuit connected to the power port via an electric power transferring electric path, and are divided into a first category including the electric power transferring power inverter circuit and a second category. The power supply apparatus includes a connection prohibiting unit which realizes a state in which the power inverter circuit included in the first category is electrically connected to the storage unit, and the power inverter circuit included in the second category is disconnected from the storage unit.

DETAILED DESCRIPTION OF THE PREFERRED EMBODIMENTS

With reference to the accompanying drawings, hereinafter are described embodiments of a power supply apparatus which is applied to a parallel hybrid vehicle.

First Embodiment

Figure 1:
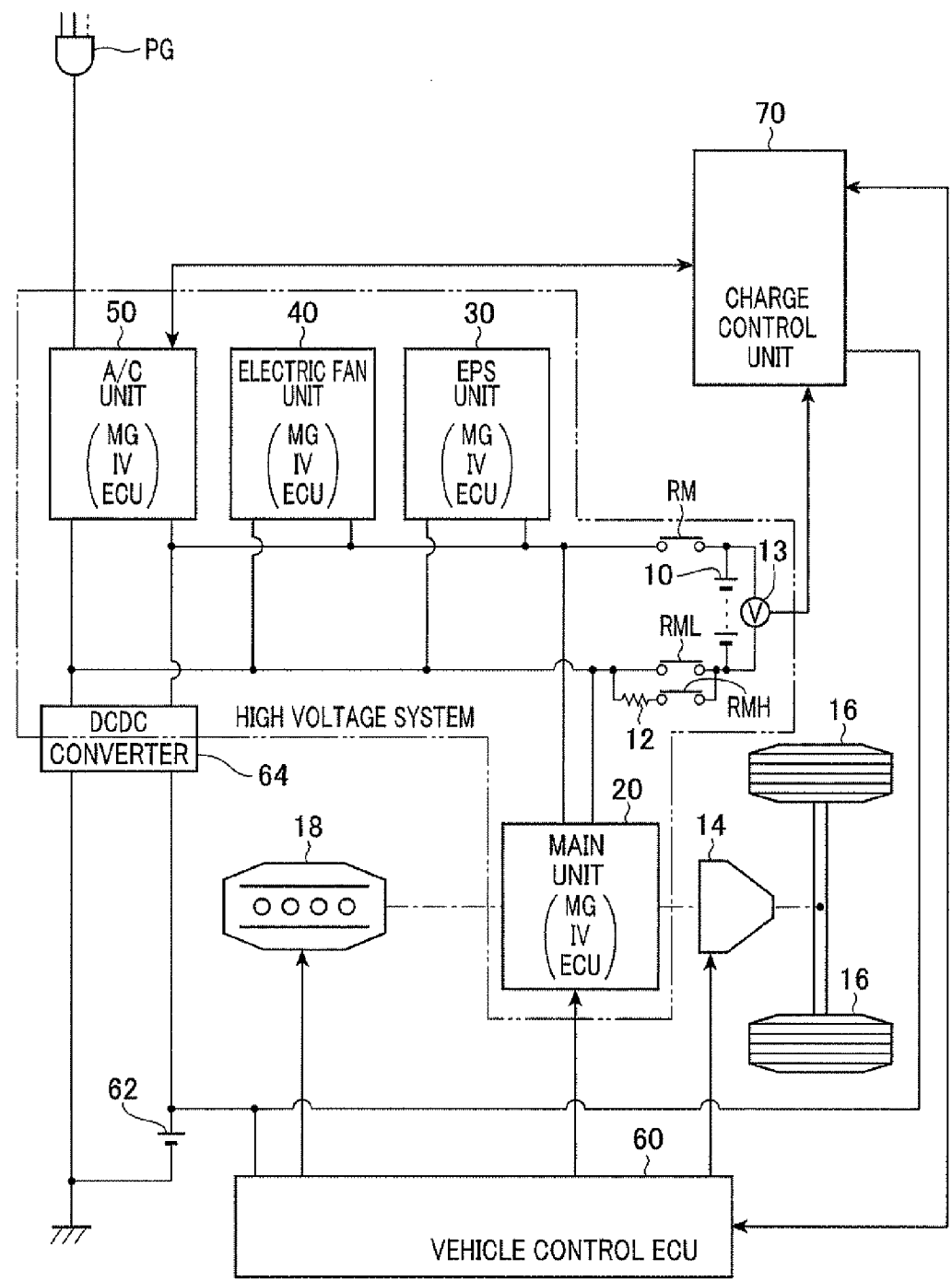
FIG. 1 is a diagram showing a system configuration according to a first embodiment.

FIG. 1 is a diagram showing a system configuration including the power supply apparatus of the embodiment. A high-voltage battery (main battery) 10 configures an in-vehicle high voltage system. The terminal voltage of the high-voltage battery 10 becomes relatively high (e.g. one hundred volts or more). The high-voltage battery 10 is connected with a main unit 20, an electric power steering unit 30, an electric fan unit 40, and an air conditioning unit 50, which are loads. Specifically, the loads are connected to one terminal of the high-voltage battery 10 (e.g. positive electrode) via a relay RM. The loads are also connected to the other terminal of the high-voltage battery 10 (e.g. negative electrode) via a parallel connection unit in which a high-resistance side relay RMH and a resistor 12 are connected with a low-resistance side relay RML in parallel.

The main unit 20 is a control system which includes a motor generator (MG) which is an in-vehicle main engine, an inverter (IV), and an electronic control unit (ECU), and controls controlled variables of the motor generator. One end of a rotating shaft of the motor generator is directly connected with an output shaft (crankshaft) of an internal combustion engine 18. The other end of the rotating shaft is mechanically coupled to drive wheels 16 via a transmission 14.

Similarly, the electric power steering unit 30 is a control system which includes a motor generator (MG) which assists the user in changing the steering angle, an inverter (IV), and an electronic control unit (ECU). The electric power steering unit 30 controls controlled variables of the motor generator. The electric fan unit 40 is a control system which includes a motor generator (MG) which rotates a fan for cooling coolant of the internal combustion engine 18, an inverter (IV), and an electronic control unit (ECU). The electric fan unit 40 controls controlled variables of the motor generator. The air conditioning unit 50 is a control system which includes a motor generator (MG) which applies rotational energy to a compressor, an inverter (IV), and an electronic control unit (ECU). The air conditioning unit 50 controls controlled variables of the motor generator.

A vehicle control ECU 60 is an electronic control unit which operates the main unit 20, the internal combustion engine 18, the transmission 14 and the like to control the operation of the vehicle. A charge control unit 70 is an electronic control unit which performs power control in the vehicle such as the control of the amount of charge of the high-voltage battery 10 based on the voltage of the high-voltage battery 10 measured by a voltage sensor 13. The vehicle control ECU 60 and the charge control unit 70 configure an in-vehicle low voltage system which is insulated from the in-vehicle high voltage system. The direct power source of the vehicle control ECU 60 and the charge control unit 70 is a low-voltage battery 62 whose terminal voltage is low (e.g. several volts to a little over ten volts). The output voltage of a DC-DC converter 64, which decreases the voltage of the high-voltage battery 10, is applied to the low-voltage battery 62, whereby the high-voltage battery 10 serves as the power source of the low-voltage battery 62. In FIG. 1, the high voltage system is enclosed within a chain double-dashed line. Note that the ECUs of the main unit 20, the electric power steering unit 30, the electric fan unit 40, and the air conditioning unit 50 are preferably installed in the low voltage system.

The charge control unit 70 has a function for operating the inverter of the air conditioning unit 50 to supply electric power to a power supply unit and receive electric power from the power supply unit. According to the function, for example, control is performed for supplying electric power from a power supply unit in, for example, a house (e.g. electric power of the commercial power source) to the high-voltage battery 10. The power supply unit and the inverter of the air conditioning unit 50 are electrically connected to each other via a plug PG. In the present embodiment, the plug PG is assumed to be an interface which is detachable from both the vehicle and the power supply unit and electrically connects between the inside of the vehicle and the outside of the vehicle. Note that the plug PG may be a part of the vehicle (which is not detachable from the vehicle), or may be a part of the power supply unit (which is not detachable from the power supply unit).

Figure 2:
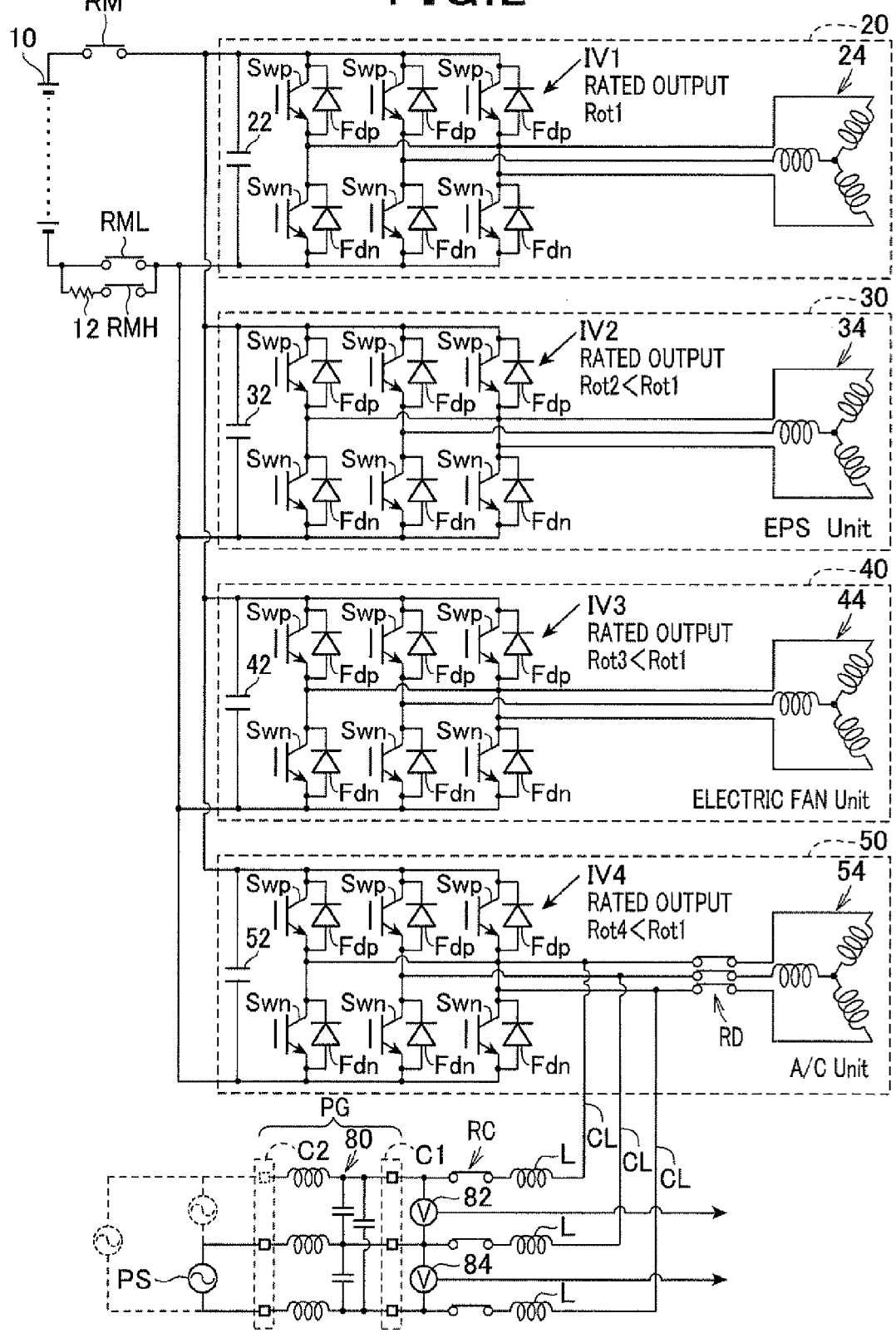
FIG. 2 is a circuit diagram showing a configuration of a power inverter circuit according to the first embodiment.

FIG. 2 shows a configuration of a power inverter circuit which includes parts of the main unit 20, the electric power steering unit 30, the electric fan unit 40, and the air conditioning unit 50.

As shown in FIG. 2, each of a main unit inverter IV1 of the main unit 20, a power steering inverter IV2 of the electric power steering unit 30, a fan inverter IV3 of the electric fan unit 40, and an air conditioning inverter IV4 of the air conditioning unit 50 has three pairs of serial connection units in which a high-electric-potential side switching element Swp and a low-electric-potential side switching element Swn are connected with each other in series. The high-electric-potential side switching element Swp is connected with a free wheel diode Fdp in antiparallel. The low-electric-potential side switching element Swn is connected with a free wheel diode Fdn in antiparallel. In FIG. 2, insulated gate bipolar transistors (IGBT) are shown as examples of the switching elements Swp and Swn.

The main unit inverter IV1 has input terminals which are connected to a capacitor 22, and output terminals which are connected to a main engine motor generator 24. The power steering inverter IV2 has input terminals which are connected to a capacitor 32, and output terminals which are connected to a power steering motor generator 34. The fan inverter IV3 has input terminals which are connected to a capacitor 42, and output terminals which are connected to a fan motor generator 44. The air conditioning inverter IV4 has input terminals which are connected to a capacitor 52, and output terminals which are connected to an air conditioning motor generator 54.

The rated output Rot1 of the main unit inverter IV1 is set so as to be larger than each of the rated output Rot2 of the power steering inverter IV2, the rated output Rot3 of the fan inverter IV3, and the rated output Rot4 of the air conditioning inverter IV4.

The output terminals of the air conditioning inverter IV4 are connected to a power port (connector C1), which is electrically connected to the outside of the vehicle, via electric power transferring electric paths CL. The connector C1 can be connected to one end of the plug PG. The other end of the plug PG is connected to a power port (connector C2) which connects a power source PS such as the commercial power source in a house, which serves as a power supply unit, to the outside of the house. The plug PG includes a filter 80. In the embodiment, an LC circuit is illustrated as the filter 80. In FIG. 2, a single-phase power source is illustrated as the power source PS. However, since the vehicle of the embodiment is assumed to be adaptable to a three-phase power source, the connector C1 includes three terminals.

Auxiliary unit Relays RD are respectively disposed between the air conditioning motor generator 54 and the connecting points between the output terminals of the air conditioning inverter IV4 and the electric power transferring electric paths CL. The auxiliary unit relays RD electrically open and close the paths between the motor generator 54 and the connecting points. The electric power transferring electric paths CL are respectively provided with power transferring relays RC, which open and close the electric paths CL, and charging reactors L which store energy. The auxiliary unit relays RD prevent electric power from being supplied to the air conditioning motor generator 54 when electric power is transferred between the power supply unit and the vehicle. The power transferring relays RC prevent the power supply unit and the air conditioning inverter IV4 from being electrically connected to each other when the air conditioning inverter IV4 is not ready to supply electric power to the power supply unit and receive electric power from the power supply unit. To realize these functions, the charge control unit 70 properly opens and closes the power transferring relays RC and the auxiliary unit relays RD.

Voltage sensors 82 and 84 are respectively provided between one of the three terminals of the connector C1 and the other two of the three terminals, and measure the potential difference therebetween. The charge control unit 70 performs control for supplying electric power supplied from the power source PS to the high-voltage battery 10 based on outputs of the voltage sensors 82 and 84 or the like.

In the present embodiment, the high-voltage battery 10 is charged by using the air conditioning inverter IV4 connected to the air conditioning motor generator 54, which is an in-vehicle electric load other than the main engine motor generator 24 which applies power to the drive wheels 16. Hence, even when the total time period during which charging is performed is increased, the efficiency of the main unit inverter IV1 does not deteriorate. In addition, the charging can be performed with high efficiency. That is, available electric power of the commercial power source is generally around 1.5 to 3 kW, which is smaller than the maximum output of the main unit inverter IV1 (e.g. 15 kW or more). Meanwhile, the ratio (efficiency) of output power of an inverter to input power of the inverter is generally maximized in the vicinity of the maximum output and becomes small in the vicinity of the minimum output. Hence, if charging is performed by using the main unit inverter IV1, the efficiency can greatly decrease. Conversely, since the maximum output of the air conditioning inverter IV4 is "several kilowatts", charging can be performed with high efficiency.

FIGS. 3A to 3D show aspects of charging control according to the embodiment. FIGS. 3A to 3D illustrate cases where electric power is supplied from a single-phase power source.

Figure 3B:
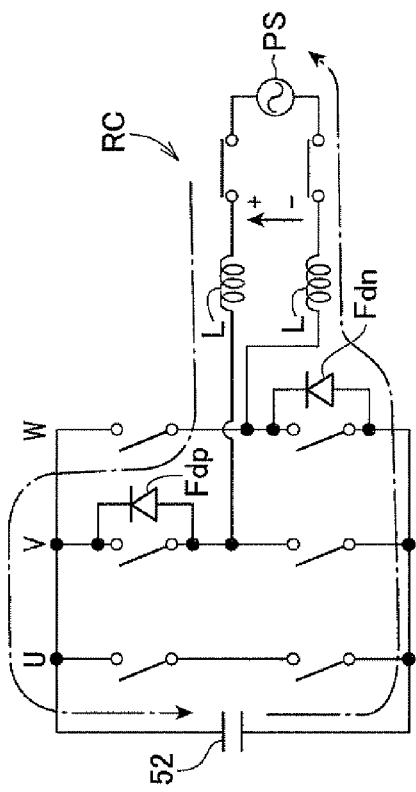
FIGS. 3A to 3D are circuit diagrams showing charging processes according to the first embodiment.
Figure 3D:
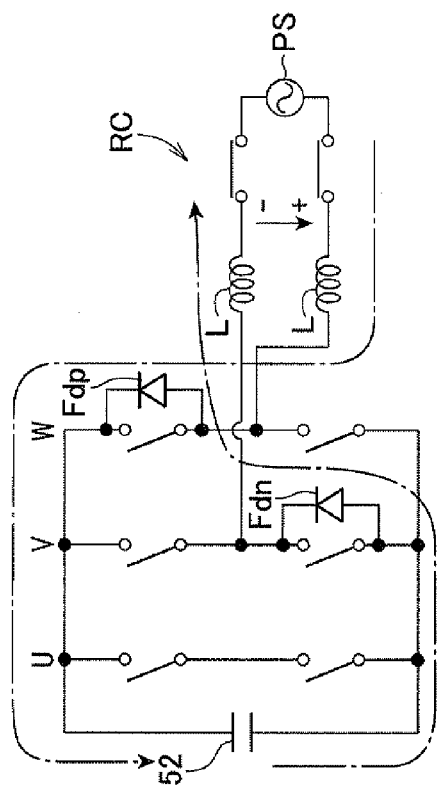
Figure 3A:
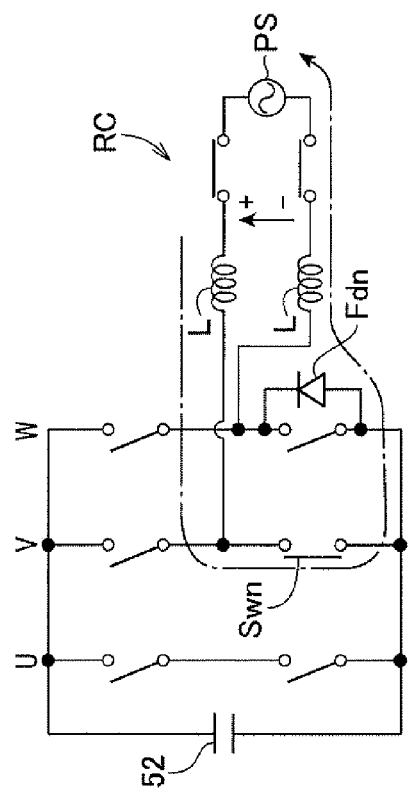

FIGS. 3A and 3B illustrate a case where the electric potential of the V-phase is higher than that of the W-phase. As shown in FIG. 3A, when the low-electric-potential side switching element Swn of the V-phase is turned on, a current passes through a loop circuit including the power source PS, the charging reactor L, the switching element Swn of the V-phase, the free wheel diode Fdn of the W-phase, and the charging reactor L, whereby energy is stored in the charging reactors L. Thereafter, as shown in FIG. 3B, when the switching element Swn of the V-phase is turned off, a current passes through a loop circuit including the power source PS, the charging reactor L, the free wheel diode Fdp of the V-phase, the capacitor 52, the free wheel diode Fdn of the W-phase, and the charging reactor L, whereby the capacitor 52 is charged, and the high-voltage battery 10 connected to the capacitor 52 in parallel is also charged.

Figure 3C:
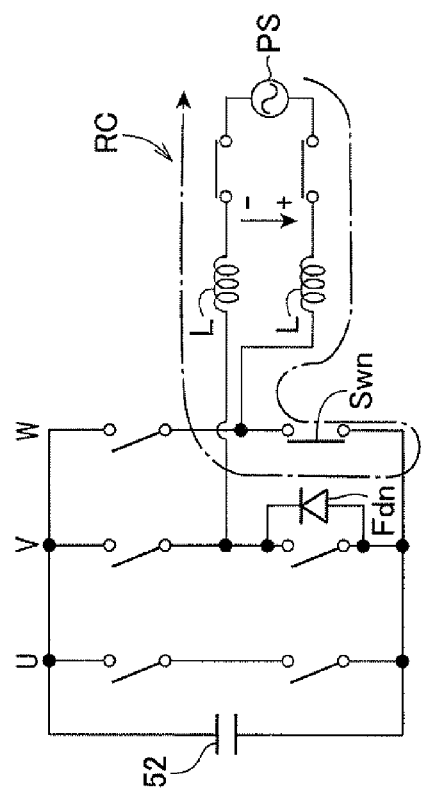

FIGS. 3C and 3D illustrate a case where the electric potential of the W-phase is higher than that of the V-phase. As shown in FIG. 3C, when the low-electric-potential side switching element Swn of the W-phase is turned on, a current passes through a loop circuit including the power source PS, the charging reactor L, the switching element Swn of the W-phase, the free wheel diode Fdn of the V-phase, and the charging reactor L, whereby energy is stored in the charging reactors L. Thereafter, as shown in FIG. 3D, when the switching element Swn of the W-phase is turned off, a current passes through a loop circuit including the power source PS, the charging reactor L, the free wheel diode Fdp of the W-phase, the capacitor 52, the free wheel diode Fdn of the V-phase, and the charging reactor L, whereby the capacitor 52 is charged, and the high-voltage battery 10 connected to the capacitor 52 in parallel is also charged.

Next, a process is described which is for switching between drive of the air conditioning motor generator 54 and charging by the air conditioning inverter IV4.

Figure 4:
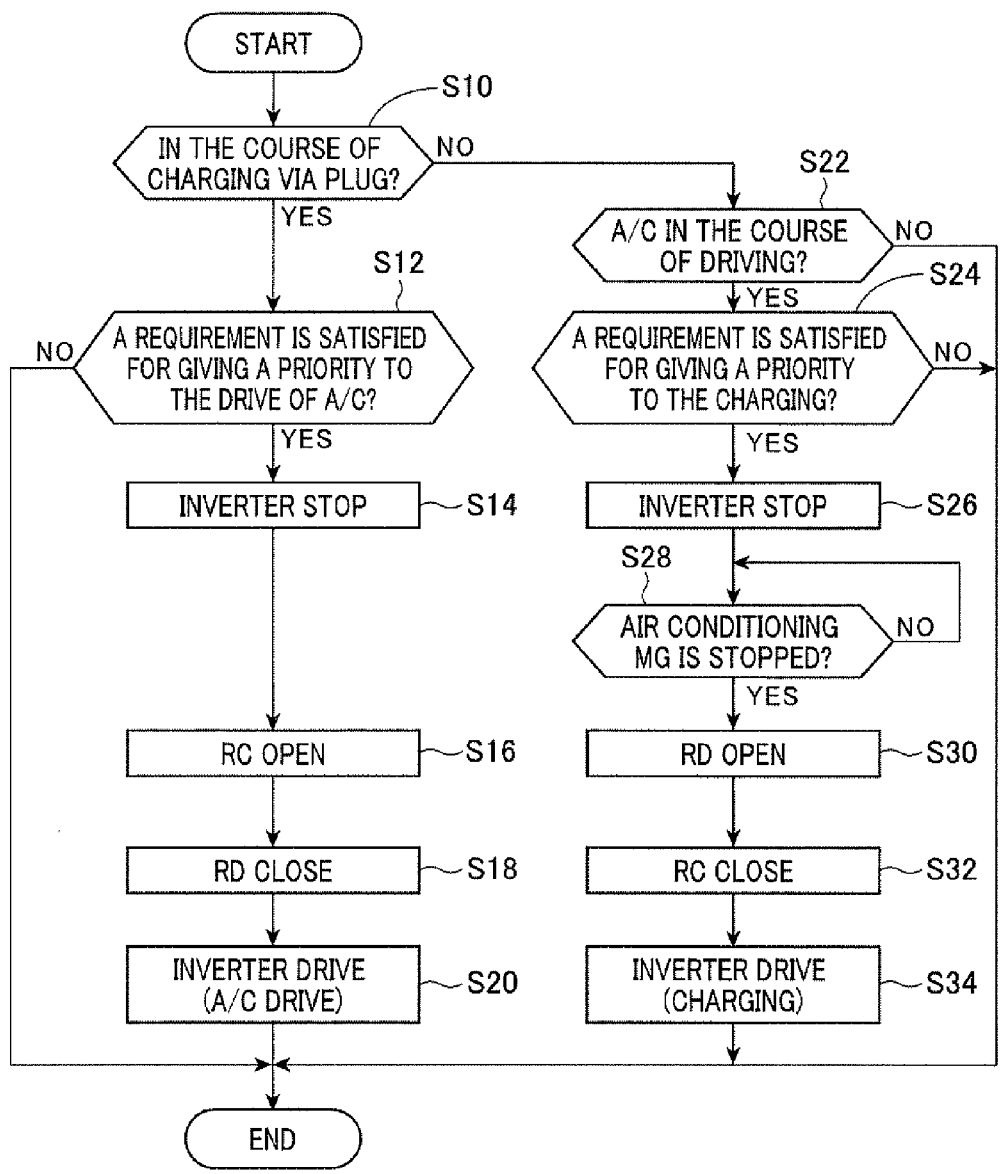
FIG. 4 is a flow chart showing a procedure of a process concerning the use of an inverter for driving an auxiliary unit according to the first embodiment.

FIG. 4 shows a procedure of the switching process. This process is repeated, for example, at a predetermined period by the charge control unit 70.

First, in step S10, the charge control unit 70 determines whether or not the high-voltage battery 10 is in the course of charging via the plug PG. When it is determined that the high-voltage battery 10 is in the course of charging, the process proceeds to step S12. In step S12, the charge control unit 70 determines whether or not a requirement is satisfied for giving a priority to the drive of the air conditioning system. This requirement may be externally provided by, for example, a user. When the requirement is satisfied, in step S14, the charge control unit 70 temporarily stops the air conditioning inverter IV4. In succeeding step S16, the charge control unit 70 switches the power transferring relays RC to opened states. The power transferring relays RC are opened after the air conditioning inverter IV4 is stopped to prevent the power transferring relays RC from being welded by interrupting a current, and to prevent noise from being generated. This considers that a current passes through the power transferring relays RC while the air conditioning inverter IV4 is driven. Thereafter, in step S18, the charge control unit 70 switches the auxiliary unit relays RD to closed states. The auxiliary unit relays RD are closed after the power transferring relays RC are opened, because when the auxiliary unit relays RD are closed while the power transferring relays RC are closed, a current can pass through the air conditioning motor generator 54, which causes the rotation of the air conditioning motor generator 54. In succeeding S20, the charge control unit 70 drives the air conditioning inverter IV4. Hence, the air conditioning motor generator 54 is driven, whereby air conditioning is controlled.

Meanwhile, in step S10, when it is determined that the high-voltage battery 10 is not in the course of charging, in step S22, the charge control unit 70 determines whether or not air conditioning is controlled by the drive of the air conditioning motor generator 54. When it is determined that air conditioning is controlled, in step S24, the charge control unit 70 determines whether or not a requirement is satisfied for giving a priority to the charging of the high-voltage battery 10 via the plug PG. This requirement may be externally provided by, for example, a user. When the requirement is satisfied, in step S26, the charge control unit 70 stops the air conditioning inverter IV4. In succeeding S28, the charge control unit 70 waits until the air conditioning motor generator 54 stops. The stop of the air conditioning motor generator 54 may be determined based on a detected value of a sensor which detects an electrical angle of the air conditioning motor generator 54. Alternatively, the stop may be determined when a period of time has passed during which it is assumed that the air conditioning motor generator 54 would stop.

When it is determined that the air conditioning motor generator 54 has stopped, in step S30, the charge control unit 70 switches the auxiliary unit relays RD to opened states. The auxiliary unit relays RD are opened after the air conditioning motor generator 54 is stopped to prevent noise from being generated by forcibly interrupting the current. This considers that a current passes through the auxiliary unit relays RD before the air conditioning motor generator 54 is stopped. Thereafter, in step S32, the charge control unit 70 switches the power transferring relays RC to closed states. The power transferring relays RC are closed after the auxiliary unit relays RD are opened, because when the power transferring relays RC are closed while the auxiliary unit relays RD are closed, a voltage whose frequency is different from the commercial power frequency can be outputted to a power supply unit. In succeeding step S34, the charge control unit 70 drives the air conditioning inverter IV4.

When the above steps S20 and S34 are completed, or the determination is negative in step S12, S22, or S24, the process is temporarily stopped.

Figure 5:
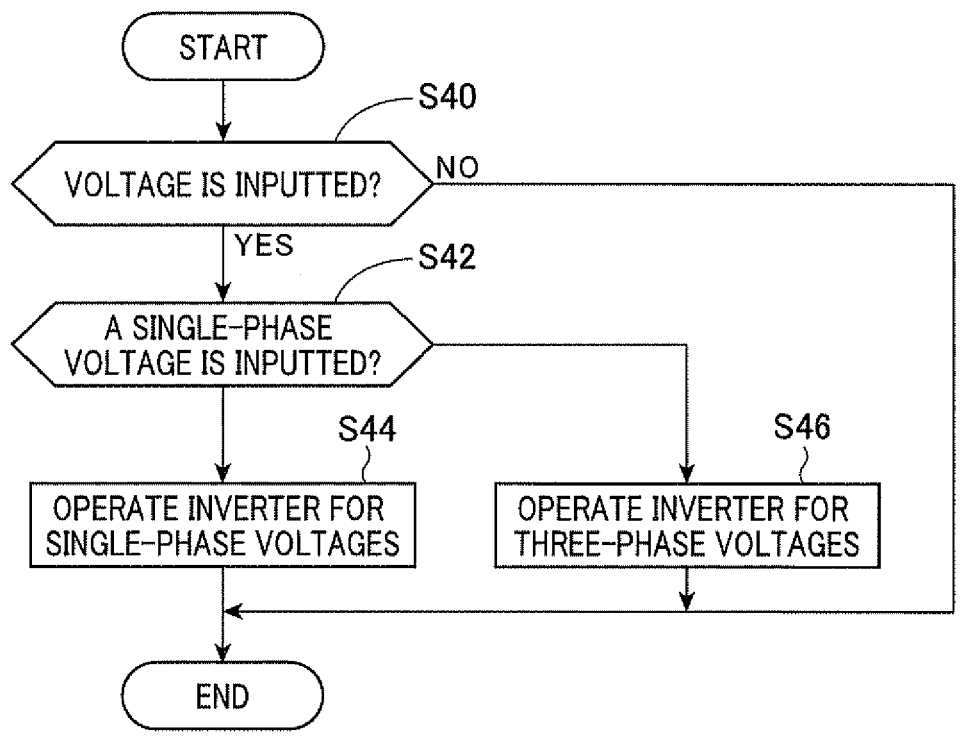
FIG. 5 is a flow chart showing a procedure for distinguishing between a single-phase voltage and a three-phase voltage.

The operation of the air conditioning inverter IV4 in the above charging process actually differs between a case where a single-phase power source is used as the power supply source and a case where a three-phase power source is used as the power supply source. The operation of the air conditioning inverter IV4 is realized by providing a function for distinguishing between the single-phase power source and the three-phase power source. FIG. 5 shows a procedure of the distinguishing process.

First, in step S40, the charge control unit 70 determines whether or not a voltage is inputted to the connector C1 based on the outputs of the voltage sensors 82 and 84. When it is determined that a voltage is inputted, in step S42, the charge control unit 70 determines whether or not a single-phase voltage is inputted based on the voltage. When it is determined that a single-phase voltage is inputted, in step S44, the charge control unit 70 operates the air conditioning inverter IV4 according to an operation method for single-phase voltages. When it is determined that a three-phase voltage is inputted, in step S46, the charge control unit 70 operates the air conditioning inverter IV4 according to an operation method for three-phase voltages.

According to the embodiment described above, the following advantages can be obtained.

(1) Electric power supplied from the outside of the vehicle is supplied to the high-voltage battery 10 by using the air conditioning inverter IV4 supplying electric power to the air conditioning motor generator 54, which is an in-vehicle electric load other than the main engine motor generator 24. Hence, required durability of the main unit inverter IV1 can be prevented from becoming excessive due to the charging process.

(2) The high-voltage battery 10 is connected to input terminals of the air conditioning inverter IV4. Since the high-voltage battery 10 is an in-vehicle storage means having large capacity, the high-voltage battery 10 can store sufficient charged electric power.

(3) The power supply apparatus includes the power transferring relays RC which open and close the electric paths CL. Hence, when a power supply unit is connected to the connector C1, and the air conditioning inverter IV4 and the like are not prepared to supply electric power to the power supply unit and receive electric power from the power supply unit, unintended electric power is prevented from being transferred.

(4) The power supply apparatus includes the auxiliary unit relays RD which open and close the electrical connection between the air conditioning inverter IV4 and the air conditioning motor generator 54. Hence, when electric power is supplied from the power supply unit, the electric power is prevented from being unintentionally supplied to the air conditioning motor generator 54.

(5) The charging reactors L are provided between the connector C1 and the connecting points between the high-electric-potential side switching elements Swp and the low-electric-potential side switching elements Swn of the air conditioning inverter IV4. Hence, while the switching elements Swp and Swn of the air conditioning inverter IV4 are used, the proper inductance can be set for charging. When coils of the air conditioning motor generator 54 are used as reactors, the proper inductance for charging cannot be obtained.

(6) The power supply apparatus includes the connector C1 which can respond to both the single-phase power source and the three-phase power source, and the function for distinguishing between the single-phase power source and the three-phase power source. Hence, a suitable process can be conducted in both cases where the external single-phase power source is connected to the connector C1 and where the external three-phase power source is connected to the connector C1.

Second Embodiment

Hereinafter, a second embodiment will be described, with focusing on differences between the second embodiment and the first embodiment.

Figure 6:
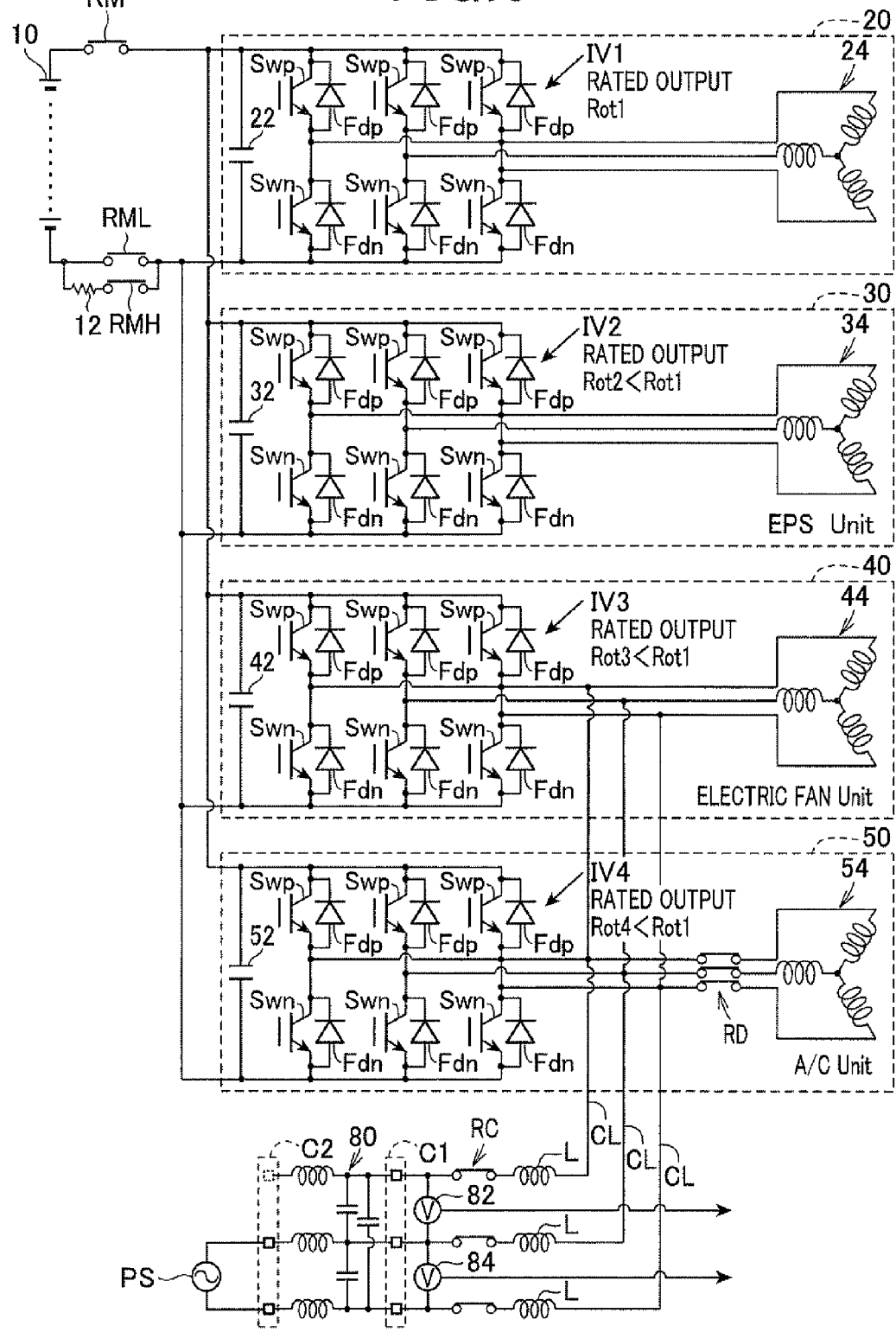
FIG. 6 is a circuit diagram showing a configuration of a power inverter circuit according to a second embodiment.

In the present embodiment, the number of inverters is two which are connected to all the electric power transferring electric paths CL connected to one connector C1. FIG. 6 shows a configuration of a power inverter circuit of the present embodiment. In FIG. 6, the same parts as those of FIG. 2 are denoted with the same reference numerals.

As shown in FIG. 6, in the present embodiment, all the electric power transferring electric paths CL connected to one connector C1 are connected to not only the air conditioning inverter IV4 but also the fan inverter IV3. Hence, when supplying electric power supplied from the power source PS via the connector C1 and the electric power transferring electric paths CL, the air conditioning inverter IV4 and the fan inverter IV3 can be used in combination. Therefore, even when the maximum output of the air conditioning inverter IV4 or the fan inverter IV3 is smaller than the electric power supplied from the power source PS, the electric power supplied from the power source PS can be properly received.

According to the embodiment described above, the following advantages can be obtained in addition to those of the first embodiment described above.

(7) The air conditioning inverter IV4 and the fan inverter IV3 are connected, in parallel, to the electric power transferring electric paths CL connected to the power source PS via one connector C1. Hence, the maximum value of electric energy can be increased which is supplied via one connector C1.

Third Embodiment

Hereinafter, a third embodiment will be described, with focusing on differences between the third embodiment and the first embodiment.

Figure 7:
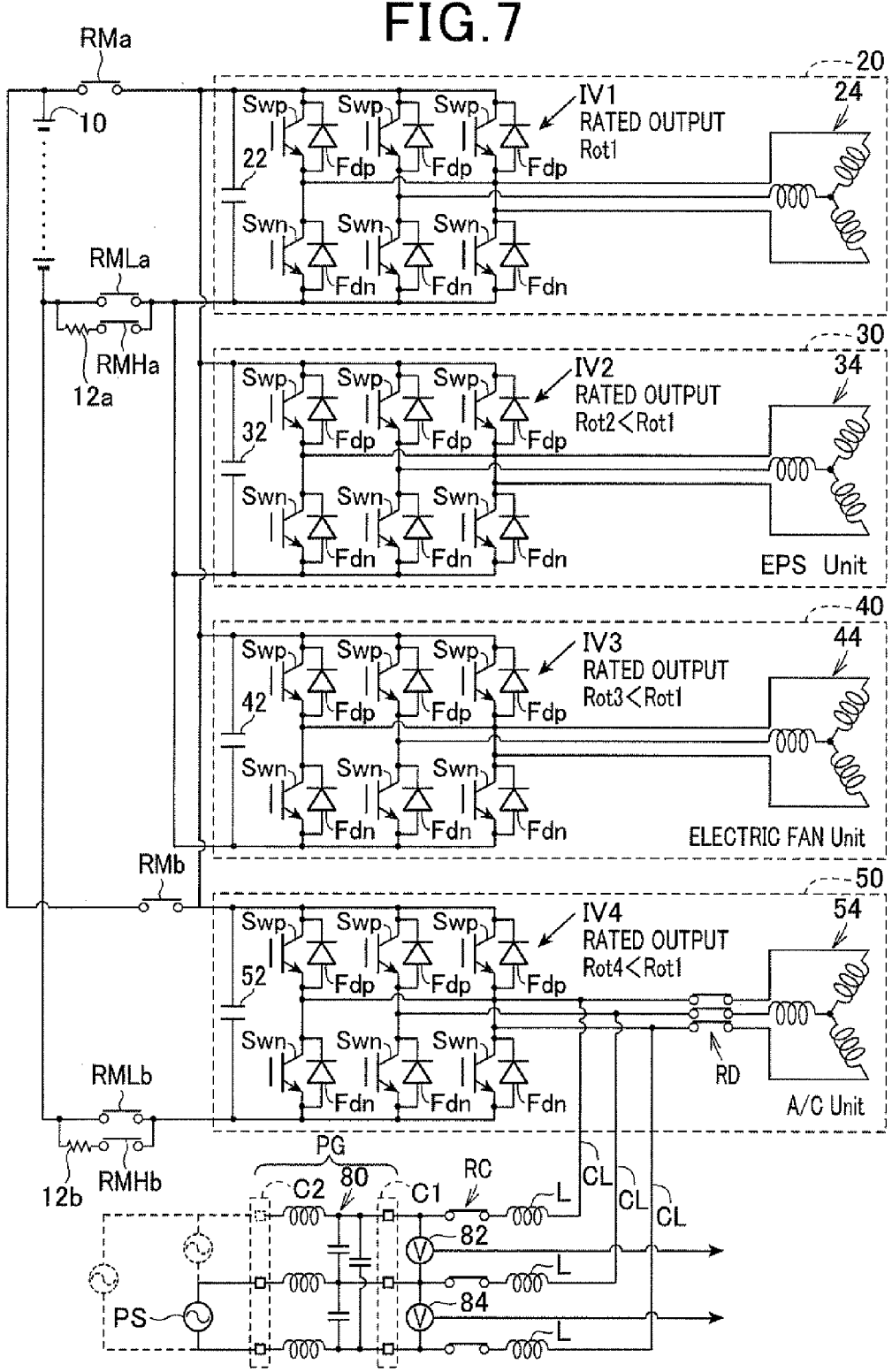
FIG. 7 is a circuit diagram showing a configuration of a power inverter circuit according to a third embodiment.

FIG. 7 shows a configuration of a power inverter circuit of the present embodiment. In FIG. 7, the same parts as those of FIG. 2 are denoted with the same reference numerals.

As shown in FIG. 7, in the present embodiment, two means are separately provided which are a means for opening and closing between the high-voltage battery 10 and each of the main unit inverter IV1, the power steering inverter IV2, and the fan inverter IV3, and a means for opening and closing between the high-voltage battery 10 and the air conditioning inverter IV4. The former means includes a relay RMa, a high-resistance relay RMHa and a low-resistance relay RMLa. The latter means includes a relay RMb, a high-resistance relay RMHb and a low-resistance relay RMLb. The high-resistance relays RMHa and RMHb are respectively connected with resistors 12a and 12b in series.

Figure 8:
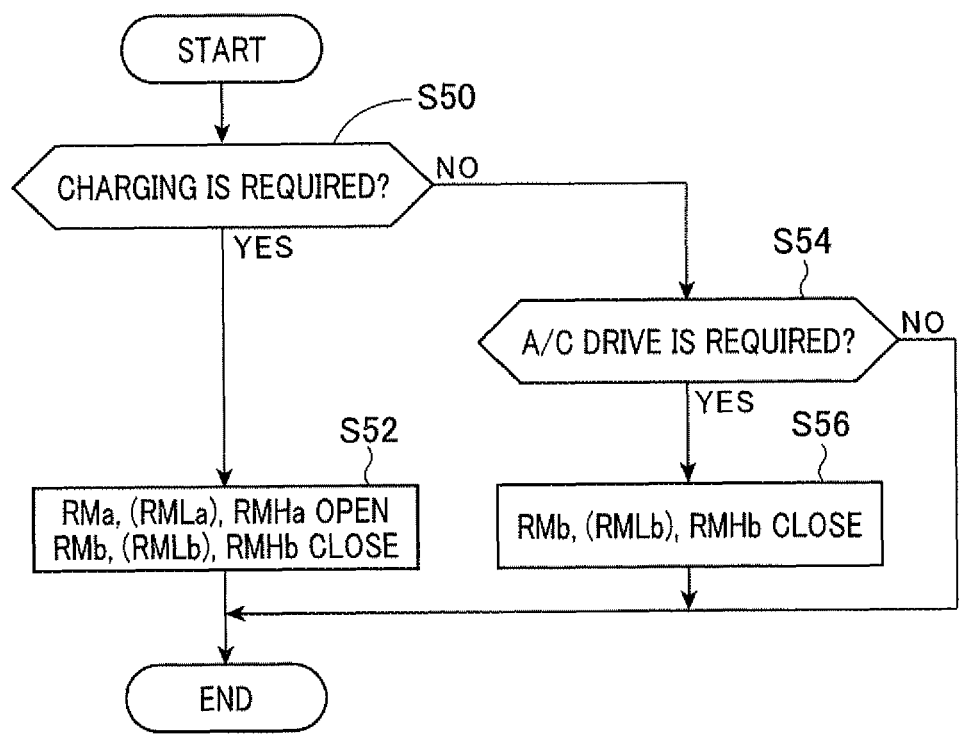
FIG. 8 is a flow chart showing a procedure of a charging process according to the third embodiment.

FIG. 8 shows a procedure of an opening and closing process of the relay RMb, the high-resistance relay RMHb, and the low-resistance relay RMLb. This process is repeated, for example, at a predetermined period by the charge control unit 70.

First, in step S50, the charge control unit 70 determines whether or not charging the high-voltage battery 10 by the external commercial power source is required. When it is determined that charging is required, in step S52, the charge control unit 70 opens the relay RMa, the high-resistance relay RMHa, and the low-resistance relay RMLa and closes the relay RMb, the high-resistance relay RMHb, and the low-resistance relay RMLb. Specifically, the objects to be closed are the relay RMb and the low-resistance relay RMLb. Note that when pre-charging the capacitor 52 has not been completed, after pre-charging the capacitor 52 while the relay RMb and the high-resistance relay RMHb are closed, the charge control unit 70 closes the low-resistance relay RMLb and opens the high-resistance relay RMHb.

This process aims to prevent standby electricity power from being consumed by the main unit inverter IV1, the power steering inverter IV2, the fan inverter IV3, and the like, when charging. When the relay RMa and at least one of the high-resistance relay RMHa and the low-resistance relay RMLa are closed, the capacitors 22, 32, and 42 are charged, or currents flow in discharging resistors (not shown) of the capacitors 22, 32, and 42, whereby standby electricity power is consumed. In a system in which the vehicle control ECU 60 is required to be activated in order to monitor the main unit inverter IV1 due to electric connection between the main unit inverter IV1 and the high-voltage battery 10, electric power is consumed even when the vehicle control ECU 60 is activated. The power consumption can be prevented by opening the relay RMa, the high-resistance relay RMHa, and the low-resistance relay RMLa. In addition, by opening the relay RMa, the high-resistance relay RMHa, and the low-resistance relay RMLa, the efficiency of the capacitors 22, 32, and 42 can be prevented from deteriorating due to the lengthened time period during which voltage is applied to the capacitors 22, 32, and 42. In addition, according to the above processes, when charging, common mode noise can be prevented from passing through the main unit inverter IV1, the power steering inverter IV2, the fan inverter IV3, and the like.

In step S50, when it is determined that charging is not required, in step S54, the charge control unit 70 determines whether or not driving the air conditioning system is required. When the driving is required, in step S56, the charge control unit 70 closes the relay RMb, the high-resistance relay RMHb, and the low-resistance relay RMLb. Specifically, the relay RMb and the low-resistance relay RMLb are basically closed. Note that when pre-charging the capacitor 52 has not been completed, after pre-charging the capacitor 52 while the relay RMb and the high-resistance relay RMHb are closed, the charge control unit 70 closes the low-resistance relay RMLb and opens the high-resistance relay RMHb. In the step S56, states of the relay RMa, the high-resistance relay RMHa, and the low-resistance relay RMLa are not particularly defined. Hence, for example, when driving the main engine is required, the relay RMa and the low-resistance relay RMLb may be closed. In addition, when the vehicle is stopped, and the air conditioning system is required to be used inside the vehicle, the charge control unit 70 opens at least one of the high-resistance relay RMHa and the low-resistance relay RMLa, or opens the relay RMa.

When the step S52 and the step S56 are completed, or the driving is not required in step S54, the whole procedure is temporarily ended.

According to the embodiment described above, the following advantages can be obtained in addition to those of the first embodiment described above.

(8) Two means are separately provided which are a means for opening and closing between the high-voltage battery 10 and the air conditioning inverter IV4 (first category) used when supplying electric power from the external commercial power source to the high-voltage battery 10, and a means for opening and closing between the high-voltage battery 10 and the inverters of the second category (the main unit inverter IV1, the power steering inverter IV2, and the fan inverter IV3). Hence, standby electricity power of the main unit inverter IV1 and the like can be prevented from being consumed, and common mode noise can be prevented from passing through the main unit inverter IV1 and the like.

Fourth Embodiment

Hereinafter, a fourth embodiment will be described, focusing on differences between the fourth embodiment and the third embodiment.

Figure 9:
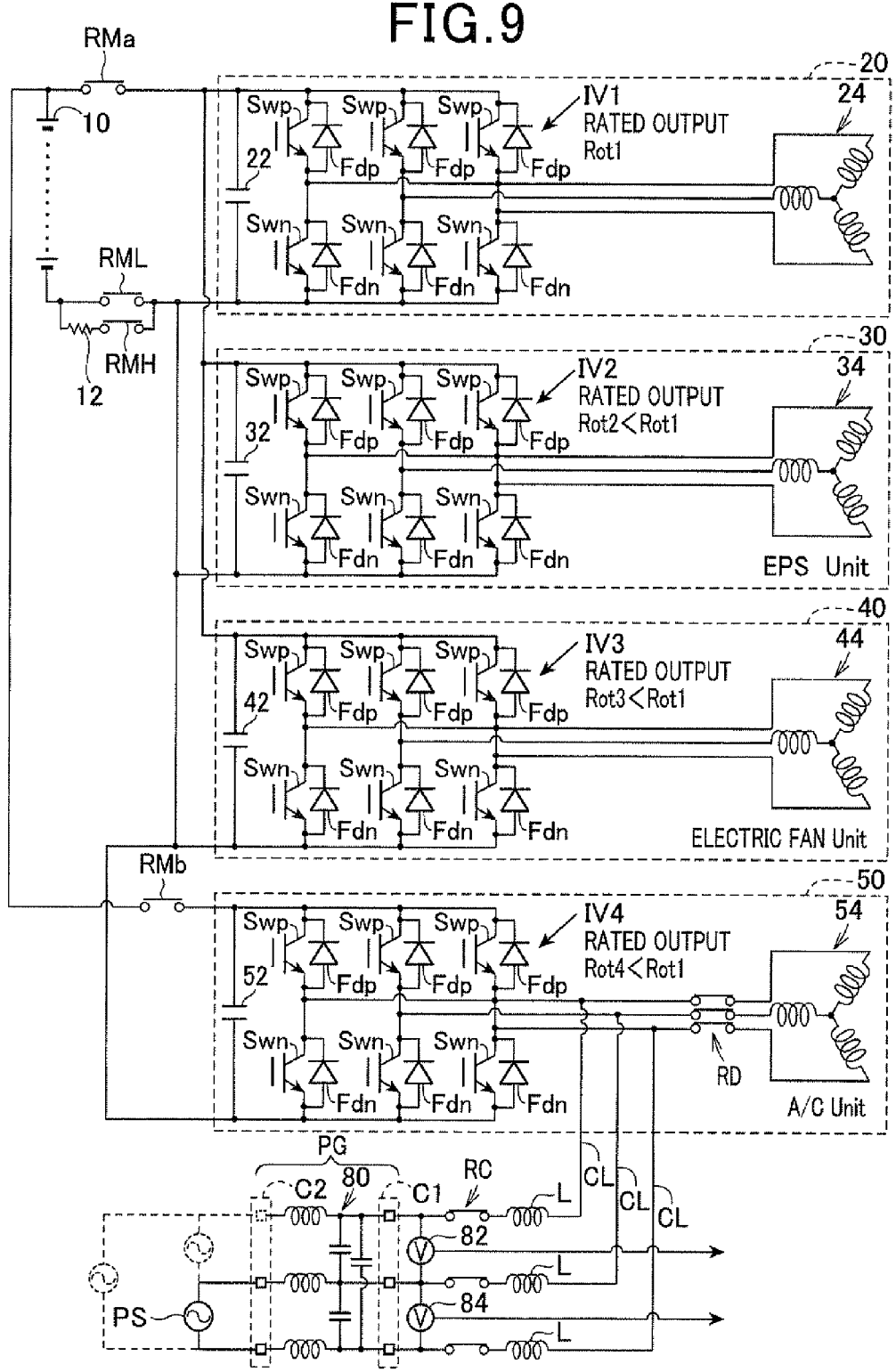
FIG. 9 is a circuit diagram showing a configuration of a power inverter circuit according to a fourth embodiment.

FIG. 9 shows a configuration of a power inverter circuit of the present embodiment. In FIG. 9, the same parts as those of FIG. 7 are denoted with the same reference numerals.

In the present embodiment, resistor 12, the high-resistance side relay RMH, and the low-resistance side relay RML are shared between two means. One means opens and closes between the high-voltage battery 10 and each of the main unit inverter IV1, the power steering inverter IV2, and the fan inverter IV3. The other means opens and closes between the high-voltage battery 10 and the air conditioning inverter IV4. Even in this case, by opening the relay RMa when the relay RMb is closed, standby electricity power can be prevented from being consumed by the main unit inverter IV1 and the like, and common mode noise can be prevented from passing through the main unit inverter IV1 and the like.

In addition, by sharing the high-resistance side relay RMH for pre-charging and the low-resistance side relay RML connected to the high-resistance side relay RMH in parallel, the number of components can be decreased. Specifically, compared with the case where the relays RMa and RMb are shared, the number of components can be effectively decreased.

Fifth Embodiment

Hereinafter, a fifth embodiment will be described, focusing on differences between the fifth embodiment and the third embodiment.

Figure 10:
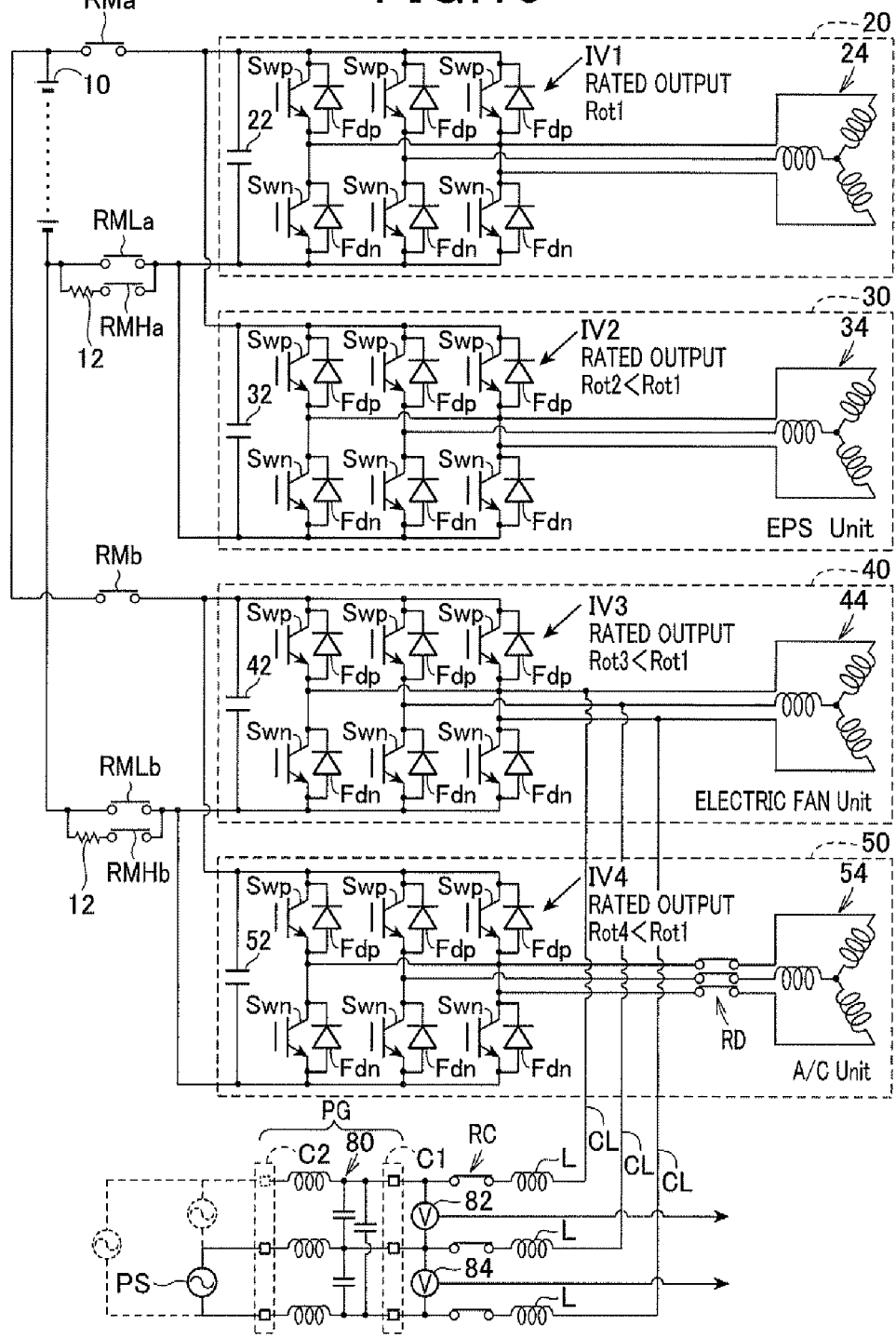
FIG. 10 is a circuit diagram showing a configuration of a power inverter circuit according to a fifth embodiment.

FIG. 10 shows a configuration of a power inverter circuit of the present embodiment. In FIG. 10, the same parts as those of FIG. 7 are denoted with the same reference numerals.

As shown in FIG. 10, in the present embodiment, the fan inverter IV3 is used when supplying electric power of the external commercial power source to the high-voltage battery 10. Note that, in the present embodiment, not only the fan inverter IV3 but also the air conditioning inverter IV4 is connected to the high-voltage battery 10 by both the high-resistance relay RMHb and the low-resistance relay RMLb and the relay RMb. Hence, when supplying electric power of the commercial power source to the high-voltage battery 10, the air conditioning inverter IV4 is also connected to the high-voltage battery 10. Hence, for example, while interrupting the connection between the main unit inverter IV1 or the like and the high-voltage battery 10 when charging, the temperature inside the vehicle can be regulated by using the air conditioning unit.

Other Embodiments

The above embodiment may be modified as described below.

<Concerning Types of the Auxiliary Unit Inverter for Supplying Electric Power to an External Unit and Receiving Electric Power from the External Unit>

The auxiliary unit inverter for supplying electric power to an external unit and receiving electric power from the external unit is not limited to the air conditioning inverter IV4 and the fan inverter IV3. For example, the power steering inverter IV2 may be used. The auxiliary unit inverter is not limited to the above three types. For example, the inverter connected to an in-vehicle rotating machine for changing the steering angle is not limited to the power steering inverter IV2, and may be an inverter of the rotating machine included in a steering-by-wire system.

<Concerning the Auxiliary Unit Power Inverter Circuit>

The auxiliary unit power inverter circuit is not limited to the DC-AC converter circuit, which converts electric power of a DC power source to AC electric power, such as a three-phase inverter connected to a three-phase rotating machine. For example, a well-known H-bridge circuit connected to a brushed DC motor may be used. This type of power inverter circuit generally has a high-electric-potential side switching element and a low-electric-potential side switching element which respectively connect terminals of the brushed DC motor to a positive electrode of a DC power source and a negative electrode of the DC power source. This type of power inverter circuit generally has one high-electric-potential side switching element and one low-electric-potential side switching element which are respectively connected to the terminals of the brushed DC motor. Hence, when the power inverter circuit inputs three-phase electric power, it is preferable that two or more high-electric-potential side switching elements and low-electric-potential side switching elements are provided which are respectively connected to the terminals of the brushed DC motor.

In addition, the in-vehicle power inverter circuit is not limited to the circuit whose output terminals are connected to a rotating machine. For example, the circuit may be configured with a high-electric-potential side switching element and a low-electric-potential side switching element, which are connected to the high-voltage battery 10 in parallel, and a voltage-decreasing (step-down) converter in which the connecting point between the switching elements is connected to a capacitor via a reactor. In this case, by connecting the electric power transferring electric path CL between the reactor and the capacitor, a specific reactor for charging is not required to be provided.

Furthermore, the auxiliary unit power inverter circuit is not limited to the circuit which configures the in-vehicle high voltage system insulated from the in-vehicle low voltage system. For example, an auxiliary unit power inverter circuit configuring the in-vehicle low voltage system may be used. Note that the capacity of the low-voltage battery 62 is small, in general. Hence, when the amount of charged electric power supplied to the vehicle from the outside of the vehicle is equal to or more than a predetermined value, it is preferable that the converter is driven to increase the voltage of the low-voltage battery 62 which is applied to the high-voltage battery 10, whereby the charged electric power is supplied to the high-voltage battery 10.

Note that the switching elements configuring the auxiliary unit power inverter circuit are not limited to IGBTs. For example, field-effect transistors can be used.

<Concerning the Use of the Auxiliary Unit Power Inverter Circuit>

The auxiliary unit power inverter circuit for supplying electric power to a power supply unit and receiving electric power from the power supply unit is not limited to being used by connecting all the electric power transferring electric paths CL which are connected to one power port (connector C1) to one auxiliary unit power inverter circuit. For example, as illustrated in JP-A-2007-318970, the terminals of the connector C1 may be separately connected to the neutral points of the three-phase rotating machine which are respectively connected to a pair of inverters. In this case, the electric power transferring electric paths include the coils of the three-phase rotating machine.

<Concerning the Means for Distinguishing Between the Single-Phase Power Source and the Three-Phase Power Source>

The means for distinguishing between the single-phase power source and the three-phase power source is not limited to performing the distinction based on a detected signal of the voltage inputted from the outside of the vehicle. For example, the means may perform the distinction based on a detection value of a sensor which senses the number of members inserted into the connector C1 of the vehicle. This can be configured by a means which is electrically switched on and off based on whether or not the members respectively corresponding to the three electric power transferring electric paths CL are inserted. The simplest one of this means is a switch which becomes on when the members are inserted which are used for only three-phase electric power.

<Concerning the Connection Prohibiting Means>

The connection prohibiting means is not limited to the example described in the above embodiment. For example, in the configuration shown in FIG. 7, the relays RMa and RMb may not be provided. In addition, in the configuration shown in FIG. 7, the high-resistance relay RMHb, the low-resistance relay RMLa, and the relay RMb may not be provided. Even in this case, when transferring electric power by using the air conditioning inverter IV4, standby electricity power and common mode noise can be suppressed by opening the high-resistance relay RMHa and the low-resistance relay RMLa or the relay RMa.

In the configuration shown in FIG. 7, the relay RMa and the relay RMb may be the same member.

In addition, each of the main unit inverter IV1, the power steering inverter IV2, the fan inverter IV3, and the air conditioning inverter IV4 may have a relay which opens and closes between each of them and the high-voltage battery 10.

<Concerning the Electric Power Transferring Power Inverter Circuit>

Even when the main unit inverter IV1 is used as the electric power transferring power inverter circuit, standby electricity power and common mode noise can be suppressed, when charging, by interrupting the connection between the high-voltage battery 10 and each of the power steering inverter IV2, the fan inverter IV3, and the air conditioning inverter IV4 when transferring the electric power. Note that this advantage can be obtained when a dedicated AC-DC converter, which transfers electric power, is used as the electric power transferring power inverter circuit.

<Concerning the Power Inverter Circuit of the First Category>

The power inverter circuit of the first category other than the electric power transferring power inverter circuit is not limited to the circuit illustrated in the above third embodiment. For example, a DC-AC converter may be used for supplying electric power to an outlet provided inside the vehicle from which electric power equivalent to that of the commercial AC voltage is supplied. In addition, when a case is expected where the low-voltage battery 62 is required to be charged while the vehicle is stopped, a DC-DC converter 64 may be provided.

<Concerning High-Resistance Path and Low-Resistance Path>

The high-resistance path and low-resistance path are not limited to the paths illustrated in the above embodiment. For example, a path generated when both the high-resistance relay RMH# (#=a, b) and the low-resistance relay RML# are closed may be used as the low-resistance path. In this case, instead of connecting the resistor 12 to only the low-resistance relay RML# in series, resistors may be connected to the high-resistance relay RMH# and the low-resistance relay RML# in series.

<Concerning Switches for Transferring Electric Power>

The switches for transferring electric power are not limited to the three electric power transferring relays RC which are respectively provided corresponding to the electric power transferring electric paths CL. For example, in the configuration in which the electric paths CL include only two electric paths assuming that only single-phase electric power is used, one electric power transferring relay RC may be provided which is connected to a path corresponding to one of the two electric paths. Even in this case, by opening the relay RC, an open loop can be established between the electric paths CL and the load such as the air conditioning inverter IV4.

In addition, instead of providing the switches for transferring electric power, a condition for connecting the plug PG may be established. Under the condition, when the vehicle is stopped and required loads are not driven, the logical product is defined as true. This is preferably realized by providing a means which prohibits the other terminal of the plug PG from being inserted into the connector C1 while the logical product is not true.

<Regarding Switches for an Auxiliary Unit>

The switches for an auxiliary unit are not limited to the three auxiliary unit relays RD which are respectively provided corresponding to the electric power transferring electric paths CL. For example, in the configuration in which the electric paths CL include only two electric paths assuming that only single-phase electric power is used, one auxiliary unit relay RD may be provided which opens and closes a path corresponding to one of the two electric paths.

The switches for an auxiliary unit may not be provided. In this case, instead of the charging reactors L, reactors for an auxiliary unit (e.g. reactors of the air conditioning motor generator 54) may be used to perform charging.

<Other Configurations>

In the step S52 of the third embodiment (FIG. 8), when the relay RMa is opened, the low-resistance relay RMLa and the high-resistance relay RMHa may be closed. When the low-resistance relay RMLa and the high-resistance relay RMHa are opened, the relay RMa may be closed.

In the above embodiment, a case is illustrated in which electric power supplied from the outside of the vehicle is supplied to the high-voltage battery 10 by using the auxiliary unit power inverter circuit. However, for example, electric power of the high-voltage battery 10 may be outputted to the outside of the vehicle by using the auxiliary unit power inverter circuit.

Instead of providing the charging reactors L for all the electric power transferring electric paths CL, for example, one or two of the charging reactors L may be respectively provided for one or two of the electric paths CL.

Instead of providing one power port (connector C1), a plurality of the power ports may be provided so as to be respectively connected to the auxiliary unit power inverter circuits.

One, two, three or more auxiliary unit power inverter circuits may be connected to all the electric power transferring electric paths CL.

In FIG. 2 and the like, a voltage-increasing (step-up) converter may be interposed between the high-voltage battery 10 and the main unit inverter IV1.

The vehicle is not limited to a parallel hybrid vehicle. For example, a series hybrid vehicle, a parallel/series hybrid vehicle and the like may be applied. Alternatively, instead of the hybrid vehicle, for example, an electric vehicle may be applied which includes an electrical rotating machine solely as an in-vehicle main engine. That is, an electric vehicle, a plug-in hybrid vehicle or a vehicle with electrically driven auxiliary units may be applied.

The control of charging and discharging the high-voltage battery 10 by the vehicle control ECU 60 is not limited to being performed based on the voltage across the high-voltage battery 10. For example, when the high-voltage battery 10 is an assembled battery which is a serial connection of battery cells, the control of charging and discharging the high-voltage battery 10 may be performed based on detection values each of which indicates a state of a predetermined number of the battery cells.

Sixth Embodiment

Figure 11:
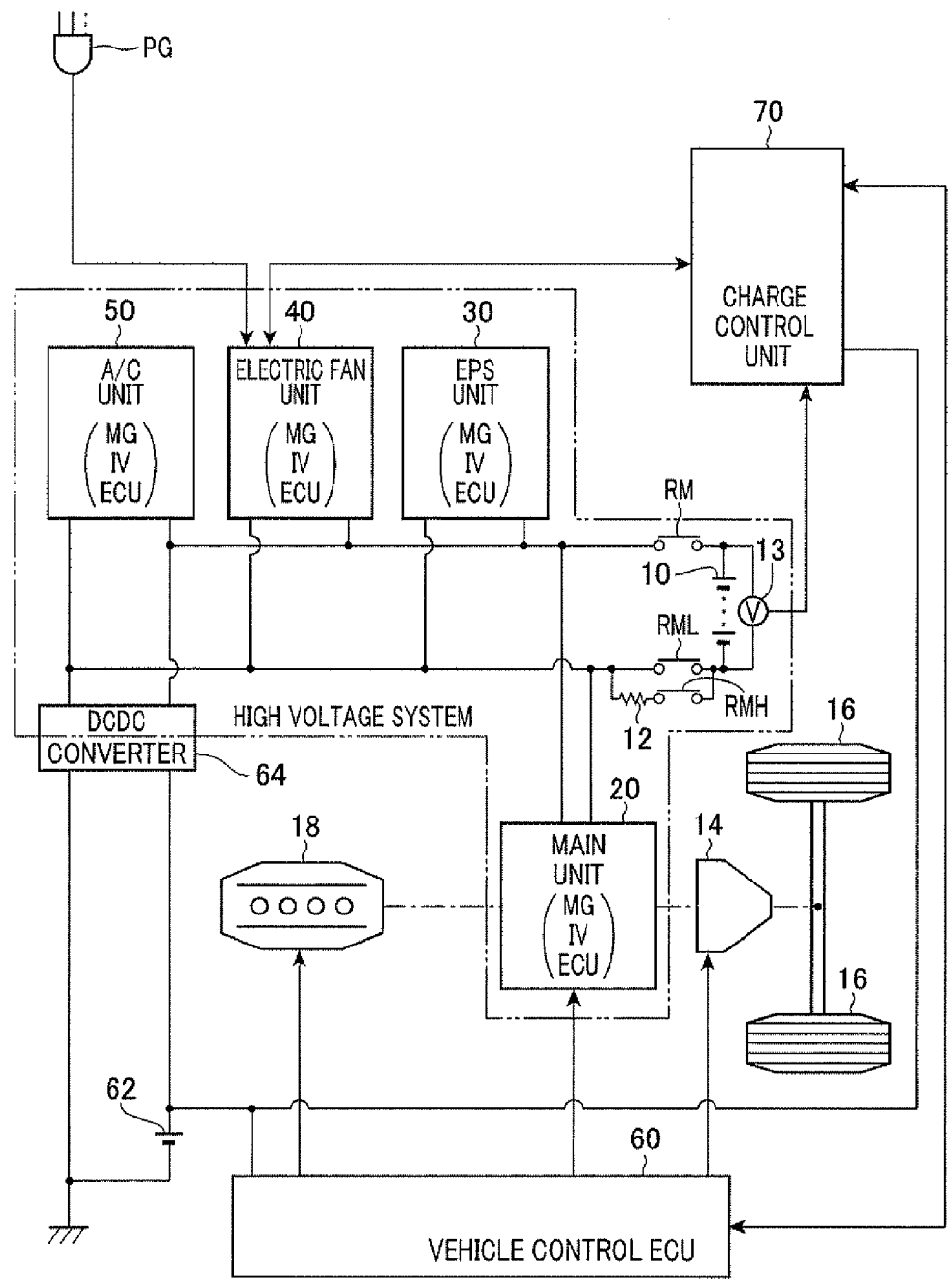
FIG. 11 is a diagram showing a system configuration according to a sixth embodiment.

FIG. 11 is a diagram showing a system configuration including the power supply apparatus of the embodiment. A high-voltage battery (main battery) 10 configures an in-vehicle high voltage system. The terminal voltage of the high-voltage battery 10 becomes relatively high (e.g. one hundred volts or more). The high-voltage battery 10 is connected with electrical loads, such as a main unit 20, an electric power steering unit 30, an electric fan unit 40, and an air conditioning unit 50. Specifically, the loads are connected to one terminal of the high-voltage battery 10 (e.g. positive electrode) via a relay RM. The loads are also connected to the other terminal of the high-voltage battery 10 (e.g. negative electrode) via a parallel connection unit in which a high-resistance side relay RMH and a resistor 12 are connected with a low-resistance side relay RML in parallel.

The main unit 20 is a control system which includes a motor generator (MG) which is an in-vehicle main engine, an inverter (IV), and an electronic control unit (ECU), and controls controlled variables of the motor generator. One end of a rotating shaft of the motor generator is directly connected with an output shaft (crankshaft) of an internal combustion engine 18. The other end of the rotating shaft is mechanically coupled to drive wheels 16 via a transmission 14.

Similarly, the electric power steering unit 30 is a control system which includes a motor generator (MG) which assists the user in changing the steering angle, an inverter (IV), and an electronic control unit (ECU). The electric power steering unit 30 controls controlled variables of the motor generator. The electric fan unit 40 is a control system which includes a motor generator (MG) which rotates a fan for cooling coolant of the internal combustion engine 18, an inverter (IV), and an electronic control unit (ECU). The electric fan unit 40 controls controlled variables of the motor generator. The air conditioning unit 50 is a control system which includes a motor generator (MG) which applies rotational energy to a compressor, an inverter (IV), and an electronic control unit (ECU). The air conditioning unit 50 controls controlled variables of the motor generator.

A vehicle control ECU 60 is an electronic control unit which operates the main unit 20, the internal combustion engine 18, the transmission 14 and the like to control the operation of the vehicle. A charge control unit 70 is an electronic control unit which performs power control in the vehicle such as the control of the amount of charge of the high-voltage battery 10 based on the voltage of the high-voltage battery 10 measured by a voltage sensor 13. The vehicle control ECU 60 and the charge control unit 70 configure an in-vehicle low voltage system which is insulated from the in-vehicle high voltage system. The direct power source of the vehicle control ECU 60 and the charge control unit 70 is a low-voltage battery 62 whose terminal voltage is low (e.g. several volts to a little over ten volts). The output voltage of a DC-DC converter 64, which decreases the voltage of the high-voltage battery 10, is applied to the low-voltage battery 62, whereby the high-voltage battery 10 serves as the power source of the low-voltage battery 62. In FIG. 11, the high voltage system is enclosed within a chain double-dashed line. Note that the ECUs of the main unit 20, the electric power steering unit 30, the electric fan unit 40, and the air conditioning unit 50 are preferably installed in the low voltage system.

The charge control unit 70 has a function for operating the inverter of the electric fan unit 40 to supply electric power to a power supply unit and receive electric power from the power supply unit. According to the function, for example, control is performed for supplying electric power from a power supply unit in, for example, a house (e.g. electric power of the commercial power source) to the high-voltage battery 10. The power supply unit and the inverter of the electric fan unit 40 are electrically connected to each other via a plug PG. In the present embodiment, the plug PG is assumed to be an interface which is detachable from both the vehicle and the power supply unit and electrically connects between the inside of the vehicle and the outside of the vehicle. Note that the plug PG may be a part of the vehicle (which is not detachable from the vehicle), or may be a part of the power supply unit (which is not detachable from the power supply unit).

Figure 12:
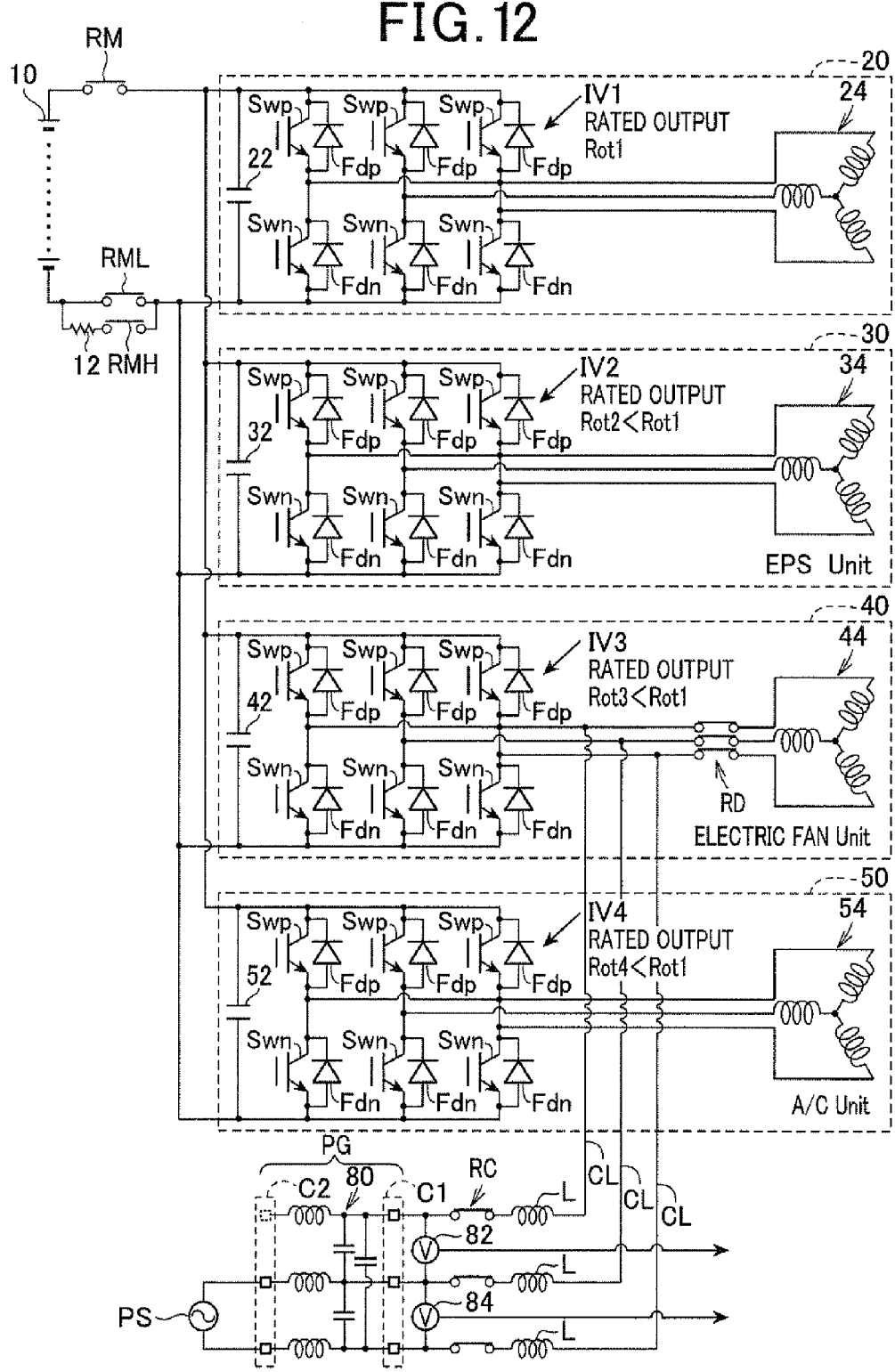
FIG. 12 is a circuit diagram showing a configuration of a power inverter circuit according to the sixth embodiment.

FIG. 12 shows a configuration of a power inverter circuit which includes parts of the main unit 20, the electric power steering unit 30, the electric fan unit 40, and the air conditioning unit 50.

As shown in FIG. 12, each of a main unit inverter IV1 of the main unit 20, a power steering inverter IV2 of the electric power steering unit 30, a fan inverter IV3 of the electric fan unit 40, and an air conditioning inverter IV4 of the air conditioning unit 50 has three pairs of serial connection units in which a high-electric-potential side switching element Swp and a low-electric-potential side switching element Swn are connected with each other in series. The high-electric-potential side switching element Swp is connected with a free wheel diode Fdp in antiparallel. The low-electric-potential side switching element Swn is connected with a free wheel diode Fdn in antiparallel. In FIG. 12, insulated gate bipolar transistors (IGBT) are shown as examples of the switching elements Swp and Swn.

The main unit inverter IV1 has input terminals which are connected to a capacitor 22, and output terminals which are connected to a main engine motor generator 24. The power steering inverter IV2 has input terminals which are connected to a capacitor 32, and output terminals which are connected to a power steering motor generator 34. The fan inverter IV3 has input terminals which are connected to a capacitor 42, and output terminals which are connected to a fan motor generator 44. The air conditioning inverter IV4 has input terminals which are connected to a capacitor 52, and output terminals which are connected to an air conditioning motor generator 54.

The rated output Rot1 of the main unit inverter IV1 is set so as to be larger than each of the rated output Rot2 of the power steering inverter IV2, the rated output Rot3 of the fan inverter IV3, and the rated output Rot4 of the air conditioning inverter IV4.

The output terminals of the fan inverter IV3 are connected to a power port (connector C1), which is electrically connected to the outside of the vehicle, via electric power transferring electric paths CL. The connector C1 can be connected to one end of the plug PG. The other end of the plug PG is connected to a power port (connector C2) which connects a power source PS such as the commercial power source in a house, which serves as a power supply unit, to the outside of the house. The plug PG includes a filter 80. In the embodiment, an LC circuit is illustrated as the filter 80. In FIG. 12, a single-phase power source is illustrated as the power source PS. However, since the vehicle of the embodiment is assumed to be adaptable to a three-phase power source, the connector C1 includes three terminals.

Auxiliary unit relays RD are respectively disposed between the fan motor generator 44 and the connecting points between the output terminals of the fan inverter IV3 and the electric power transferring electric paths CL. The auxiliary unit relays RD electrically open and close the paths between the fan motor generator 44 and the connecting points. The electric power transferring electric paths CL are respectively provided with power transferring relays RC, which open and close the electric paths CL, and charging reactors L which store energy. The auxiliary unit relays RD prevent electric power from being supplied to the fan motor generator 44 when electric power is transferred between the power supply unit and the vehicle. The power transferring relays RC prevent the power supply unit and the fan inverter IV3 from being electrically connected to each other when the fan inverter IV3 is not ready to supply electric power to the power supply unit and receive electric power from the power supply unit. To realize these functions, the charge control unit 70 properly opens and closes the power transferring relays RC and the auxiliary unit relays RD.

Voltage sensors 82 and 84 are respectively provided between one of the three terminals of the connector C1 and the other two of the three terminals, and measure the potential difference therebetween. The charge control unit 70 performs control for supplying electric power supplied from the power source PS to the high-voltage battery 10 based on outputs of the voltage sensors 82 and 84 or the like.

In the present embodiment, the high-voltage battery 10 is charged by using the fan inverter IV3 connected to the fan motor generator 44, which is an in-vehicle electric load other than the main engine motor generator 24 which applies power to the drive wheels 16. Hence, even when the total time period during which charging is performed is increased, the efficiency of the main unit inverter IV1 does not deteriorate. In addition, the charging can be performed with high efficiency. That is, available electric power of the commercial power source is generally around 1.5 to 3 kW, which is smaller than the maximum output of the main unit inverter IV1 (e.g. 15 kW or more). Meanwhile, the ratio (efficiency) of output power of an inverter to input power of the inverter is generally maximized in the vicinity of the maximum output and becomes small in the vicinity of the minimum output. Hence, if charging is performed by using the main unit inverter IV1, the efficiency can greatly decrease. Conversely, since the maximum output of the fan inverter IV3 is "several kilowatts", charging can be performed with high efficiency.

FIGS. 13A to 13D show aspects of charging control according to the embodiment. FIGS. 13A to 13D illustrate cases where electric power is supplied from a single-phase power source.

Figures 13A, 13B, 13C, 13D:
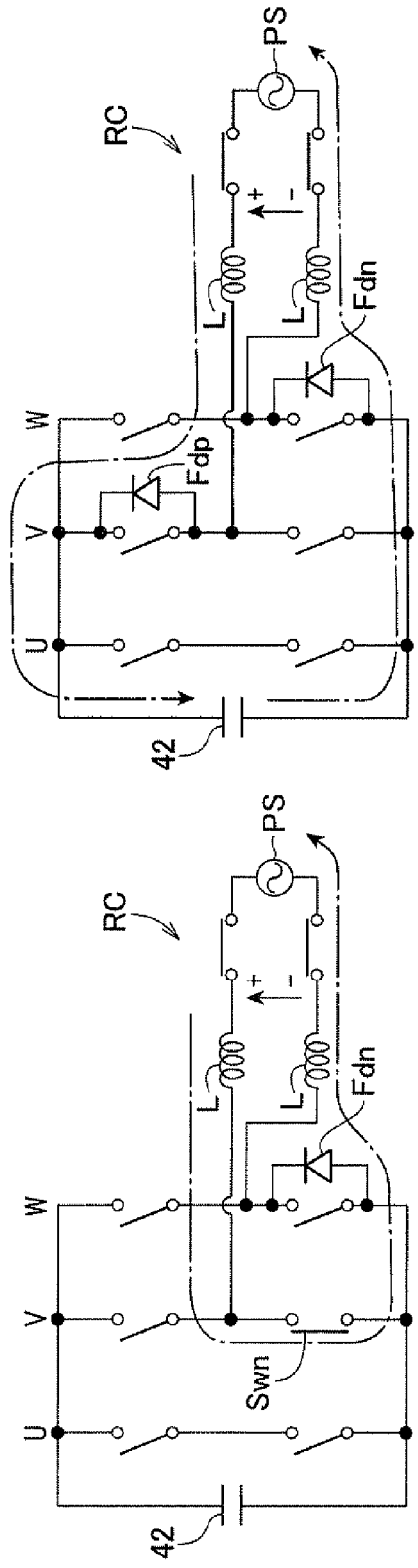
FIGS. 13A to 13D are circuit diagrams showing charging processes according to the sixth embodiment.

FIGS. 13A and 13B illustrate a case where the electric potential of the V-phase is higher than that of the W-phase. As shown in FIG. 13A, when the low-electric-potential side switching element Swn of the V-phase is turned on, a current passes through a loop circuit including the power source PS, the charging reactor L, the switching element Swn of the V-phase, the free wheel diode Fdn of the W-phase, and the charging reactor L, whereby energy is stored in the charging reactors L. Thereafter, as shown in FIG. 13B, when the switching element Swn of the V-phase is turned off, a current passes through a loop circuit including the power source PS, the charging reactor L, the free wheel diode Fdp of the V-phase, the capacitor 42, the free wheel diode Fdn of the W-phase, and the charging reactor L, whereby the capacitor 42 is charged, and the high-voltage battery 10 connected to the capacitor 42 in parallel is also charged.

FIGS. 13C and 13D illustrate a case where the electric potential of the W-phase is higher than that of the V-phase. As shown in FIG. 13C, when the low-electric-potential side switching element Swn of the W-phase is turned on, a current passes through a loop circuit including the power source PS, the charging reactor L, the switching element Swn of the W-phase, the free wheel diode Fdn of the V-phase, and the charging reactor L, whereby energy is stored in the charging reactors L. Thereafter, as shown in FIG. 13D, when the switching element Swn of the W-phase is turned off, a current passes through a loop circuit including the power source PS, the charging reactor L, the free wheel diode Fdp of the W-phase, the capacitor 42, the free wheel diode Fdn of the V-phase, and the charging reactor L, whereby the capacitor 42 is charged, and the high-voltage battery 10 connected to the capacitor 42 in parallel is also charged.

The maximum output required of the fan motor generator 44 is smaller than that of the commercial power source (for example, 1.5 kW when using a 100V single-phase power source, 3 kW when using a 200V single-phase power source) in general. Hence, if the fan inverter IV3 is designed so as to be able to handle the minimum electric power required for driving the fan motor generator 44 (less than 1.5 kW), sufficient electric power cannot be supplied to the commercial power source and received from the commercial power source. To solve this problem, it can be considered that the fan inverter IV3 and the air conditioning inverter IV4 are used in combination. However, in this case, required hardware means increase such that the number of the auxiliary unit relays RD increases and the length of the electric power transferring electric paths CL increases.

Figure 14A:
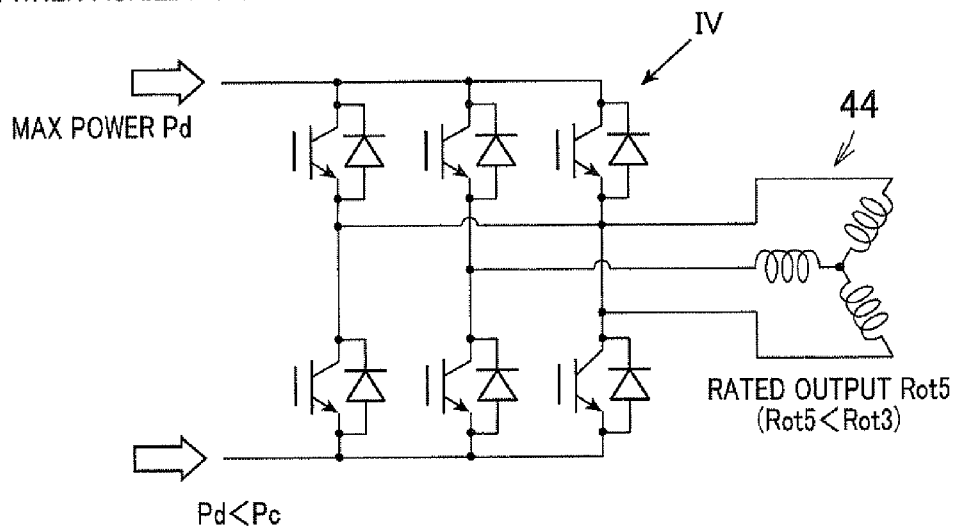
FIGS. 14A and 14B are diagrams showing a setting of the maximum value of input electric power of an inverter according to the sixth embodiment.
Figure 14B:
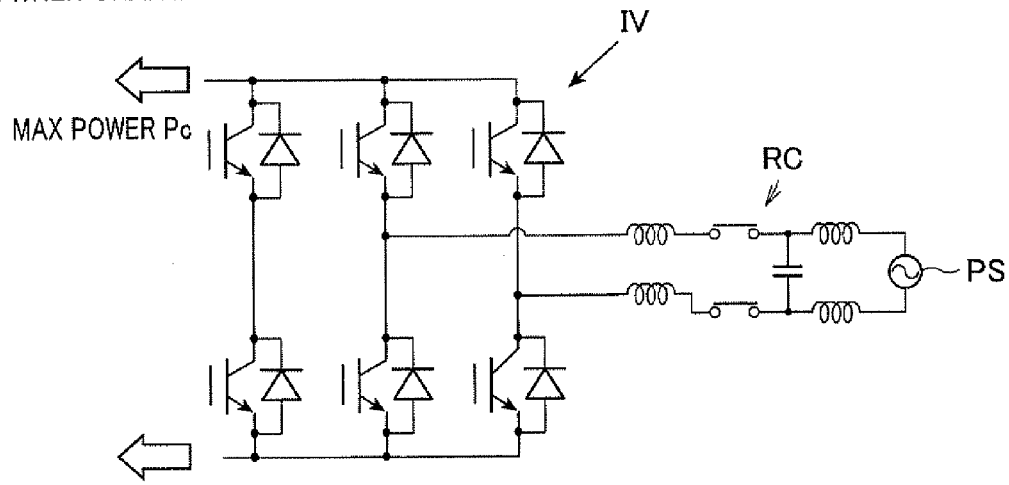

To solve the above problems, as shown in FIG. 14A, the rated output Rot3 of the fan inverter IV3 is set to be larger than the rated output Rot5 of the fan motor generator 44, the fan inverter IV3 is redundantly designed from the viewpoint of driving the fan motor generator 44. Hence, the maximum value Pc of electric power passing through the input terminals of the fan inverter IV3 when charging, which is shown in FIG. 14B, can be larger than the maximum value Pd of electric power passing through the input terminals of the fan inverter IV3 when the fan motor generator 44 is driven, as shown in FIG. 14A. Note that, FIG. 14B shows a case in which electric power is supplied from the 200V single-phase power source. The electric power is generally around 3 kW, which is larger than the maximum output of the fan motor generator 44 (less than 1.5 kW) assumed in the present embodiment.

According to the embodiment described above, the following advantages can be obtained.

(1) The maximum value Pc of electric power passing through the input terminals of the fan inverter IV3 when supplying electric power to the power supply unit or receiving electric power from the power supply unit through the connector C1 is set to be larger than the maximum value Pd of electric power passing through the input terminals of the fan inverter IV3 when the fan motor generator 44 is driven. Hence, electric power can be effectively supplied to the power supply unit and received from the power supply unit by using only the fan inverter IV3.

(2) The rated output Rot3 of the fan inverter IV3 is larger than the rated output Rot5 of the fan motor generator 44. Hence, since only the fan inverter IV3 is required to be subjected to redundant design, the fan motor generator 44 is not required to be unnecessarily large in size.

(3) The common high-voltage battery 10 is connected to the input terminals of the fan inverter IV3 and the input terminals of the main unit inverter IV1. Since the capacity of the high-voltage battery 10 is larger than those of other storing means in the vehicle, large discharged electric power and charged electric power can be obtained when supplying electric power to a power supply unit or receiving electric power from the power supply unit.

(4) The power inverter circuit for supplying electric power to a power supply unit and receiving electric power from the power supply unit is limited to the fan inverter IV3. Hence, the number of components such as the power transferring relay RC can be prevented from increasing.

Other Embodiments

The above embodiment may be modified as described below.

<Concerning Types of the Auxiliary Unit Inverter for Supplying Electric Power to an External Unit and Receiving Electric Power from the is External Unit>

The auxiliary unit inverter for supplying electric power to an external unit and receiving electric power from the external unit is not limited to the fan inverter IV3. For example, the air conditioning inverter IV4 or the power steering inverter IV2 may be used. The auxiliary unit inverter is not limited to the above three types. For example, the inverter connected to an in-vehicle rotating machine for changing the steering angle is not limited to the power steering inverter IV2, and may be an inverter of the rotating machine included in a steering-by-wire system.

<Concerning the Auxiliary Unit Power Inverter Circuit>

The auxiliary unit power inverter circuit is not limited to the DC-AC converter circuit, which converts electric power of a DC power source to AC electric power, such as a three-phase inverter connected to a three-phase rotating machine. For example, a power inverter circuit connected to a brushed DC motor may be used. This type of power inverter circuit generally has a high-electric-potential side switching element and a low-electric-potential side switching element which respectively connect terminals of the brushed DC motor to a positive electrode of a DC power source and a negative electrode of the DC power source. This type of power inverter circuit generally has one high-electric-potential side switching element and one low-electric-potential side switching element which are respectively connected to the terminals of the brushed DC motor. Hence, when the power inverter circuit inputs three-phase electric power, it is preferable that two or more high-electric-potential side switching elements and low-electric-potential side switching elements are provided which are respectively connected to the terminals of the brushed DC motor.

In addition, the in-vehicle power inverter circuit is not limited to the circuit whose output terminals are connected to a rotating machine. For example, the circuit may be configured with a high-electric-potential side switching element and a low-electric-potential side switching element, which are connected to the high-voltage battery 10 in parallel, and a voltage-decreasing (step-down) converter in which the connecting point between the switching elements is connected to a capacitor via a reactor. In this case, by connecting the electric power transferring electric path CL between the reactor and the capacitor, a specific reactor for charging is not required to be provided.

Furthermore, the auxiliary unit power inverter circuit is not limited to the circuit which configures the in-vehicle high voltage system insulated from the in-vehicle low voltage system. For example, an auxiliary unit power inverter circuit configuring the in-vehicle low voltage system may be used. Note that the capacity of the low-voltage battery 62 is small, in general. Hence, when the amount of charged electric power supplied to the vehicle from the outside of the vehicle is equal to or more than a predetermined value, it is preferable that the converter is driven to increase the voltage of the low-voltage battery 62 which is applied to the high-voltage battery 10, whereby the charged electric power is supplied to the high-voltage battery 10.

Note that the switching elements configuring the auxiliary unit power inverter circuit are not limited to IGBTs. For example, field-effect transistors can be used.

<Concerning the Use of the Auxiliary Unit Power Inverter Circuit>

The auxiliary unit power inverter circuit for supplying electric power to a power supply unit and receiving electric power from the power supply unit is not limited to being used by connecting all the electric power transferring electric paths CL which are connected to one power port (connector C1) to one auxiliary unit power inverter circuit. For example, as illustrated in JP-A-2007-318970, the terminals of the connector C1 may be separately connected to the neutral points of the three-phase rotating machine which are respectively connected to a pair of inverters. In this case, the electric power transferring electric paths include the coils of the three-phase rotating machine.

<Concerning Switches for Transferring Electric Power>

The switches for transferring electric power are not limited to the three electric power transferring relays RC which are respectively provided corresponding to the electric power transferring electric paths CL. For example, in the configuration in which the electric paths CL include only two electric paths assuming that only single-phase electric power is used, one electric power transferring relay RC may be provided which is connected to a path corresponding to one of the two electric paths. Even in this case, by opening the relay RC, an open loop can be established between the electric paths CL and the power inverter circuit or the like.

In addition, instead of providing the switches for transferring electric power, a condition for connecting the plug PG may be established. Under the condition, when the vehicle is stopped and required loads are not driven, the logical product is defined as true. This is preferably realized by providing a means which prohibits the other terminal of the plug PG from being inserted into the connector C1 while the logical product is not true.

<Regarding Switches for an Auxiliary Unit>

The switches for an auxiliary unit are not limited to the three auxiliary unit relays RD which are respectively provided corresponding to the electric power transferring electric paths CL. For example, in the configuration in which the electric paths CL include only two electric paths assuming that only single-phase electric power is used, one auxiliary unit relay RD may be provided which opens and closes a path corresponding to one of the two electric paths.

The switches for an auxiliary unit may not be provided. In this case, instead of the charging reactors L, reactors for an auxiliary unit (e.g. reactors of the fan motor generator 44) may be used to perform charging.

<Other Configurations>

Instead of providing the charging reactors L for all the electric power transferring electric paths CL, for example, one or two of the reactors L may be respectively provided for one or two of the electric paths CL.

Instead of providing one power port (connector C1), a plurality of the power ports may be provided so as to be respectively connected to the auxiliary unit power inverter circuits.

One, two or more auxiliary unit power inverter circuits may be connected to all the electric power transferring electric paths CL.

In FIG. 12 and the like, a voltage-increasing (step-up) converter may be interposed between the high-voltage battery 10 and the main unit inverter IV1.

The vehicle is not limited to a parallel hybrid vehicle. For example, a series hybrid vehicle, a parallel/series hybrid vehicle and the like may be applied. Alternatively, instead of the hybrid vehicle, for example, an electric vehicle may be applied which includes an electrical rotating machine solely as an in-vehicle main engine. That is, an electric vehicle, a plug-in hybrid vehicle or a vehicle with electrically driven auxiliary units may be applied.

The control of charging and discharging the high-voltage battery 10 by the vehicle control ECU 60 is not limited to being performed based on the voltage across the high-voltage battery 10. For example, when the high-voltage battery 10 is an assembled battery which is a serial connection of battery cells, the control of charging and discharging the high-voltage battery 10 may be performed based on detection values each of which indicates a state of a predetermined number of the battery cells.

Hereinafter, aspects of the above-described embodiments will be summarized.

As an aspect of the embodiment, a power supply apparatus for a vehicle is provided which supplies electric power to a power supply unit and charges electric power from the power supply unit to a main battery of an electric vehicle, a plug-in hybrid vehicle or a vehicle with electrically driven auxiliary units via a power port, wherein the vehicle includes a plurality of power inverter circuits which are connected to a common storage unit in parallel, and the plurality of power inverter circuits include an electric power transferring power inverter circuit connected to the power port via an electric power transferring electric path, and are divided into a first category including the electric power transferring power inverter circuit and a second category. The power supply apparatus includes a connection prohibiting unit which realizes a state in which the power inverter circuit included in the first category is electrically connected to the storage unit, and the power inverter circuit included in the second category is disconnected from the storage unit.

When the plurality of power inverter circuits are connected to the storage unit in parallel, and electric power is transferred by using the electric power transferring power inverter circuit, standby electricity power can be consumed by other power inverter circuits and members connected thereto. According to the above embodiment, by providing the connection prohibiting unit, the standby electricity power can be prevented from being consumed by the power inverter circuits included in the second category or the like when transferring electric power.

In the power supply apparatus, the vehicle includes a rotating machine which is mechanically coupled to drive wheels, and an auxiliary electric load (s), the plurality of power inverter circuits include a main unit power inverter circuit which is operated to control power applied to the drive wheels by the rotating machine, and an auxiliary unit power inverter circuit which is interposed between the auxiliary electric load and the storage unit and is operated to control the auxiliary unit, the electric power transferring power inverter circuit includes the auxiliary unit power inverter circuit, and the main unit power inverter circuit is included in the second category.

According to the power supply apparatus, an auxiliary unit power inverter circuit is used when supplying electric power to the power supply unit or receiving electric power from the power supply unit via the power port. Hence, required durability of the main unit power inverter circuit can be prevented from becoming excessive due to the transfer of the electric power.

In the power supply apparatus, the connection prohibiting unit includes a first relay which opens and closes between an input terminal of the power inverter circuit included in the first category and the storage unit, and a second relay which opens and closes between an input terminal of the power inverter circuit included in the second category and the storage unit.

In the power supply apparatus, the first relay includes a first high-electric-potential side relay which opens and closes between the storage unit and a high-electric-potential side input terminal of the power inverter circuit included in the first category, and a first low-electric-potential side relay which opens and closes between the storage unit and a low-electric-potential side input terminal of the power inverter circuit included in the first category, and the second relay includes a second high-electric-potential side relay which opens and closes between the storage unit and a high-electric-potential side input terminal of the power inverter circuit included in the second category, and a second low-electric-potential side relay which opens and closes between the storage unit and a low-electric-potential side input terminal of the power inverter circuit included in the second category.

In the power supply apparatus, at least one of a first set of the first high-electric-potential side relay and the second high-electric-potential side relay and a second set of the first low-electric-potential side relay and the second low-electric-potential side relay is configured with the same member, thereby sharing the member with the power inverter circuit included in the first category and the power inverter circuit included in the second category.

According to the power supply apparatus, the number of components can be prevented from increasing.

In the power supply apparatus, a capacitor is connected to a pair of input terminals of the power inverter circuit included in the first category in parallel, a capacitor is connected to a pair of input terminals of the power inverter circuit included in the second category in parallel, and one of the first set and the second set, which is shared, includes a low-resistance relay and a high-resistance relay which respectively open and close a low-resistance path and a high-resistance path which connect between the storage unit and the input terminals of the power inverter circuit included in the first category and between the storage unit and the input terminals of the power inverter circuit included in the second category.

According to the power supply apparatus, sharing a means for pre-charging the capacitor can properly prevent the increase of the number of components.

In the power supply apparatus, the power inverter circuit included in the first category is configured with only the electric power transferring power inverter circuit.

In the power supply apparatus, the electric power transferring power inverter circuit includes a plurality of the auxiliary unit power inverter circuits connected to electric paths, which connect between the power supply unit and the power port, via the electric power transferring electric path.

The rated output of the auxiliary unit power inverter circuit is smaller than that of the main unit power inverter circuit. However, according to the power supply apparatus, since a plurality of power inverter circuits can be used which are connected to each other in parallel, the maximum value of electric energy can be increased which is transferred via the power port.

As another aspect of the embodiment, a power supply apparatus for a vehicle which supplies electric power to a power supply unit and charges electric power from the power supply unit to a main battery of an electric vehicle, a plug-in hybrid vehicle or a vehicle with electrically driven auxiliary units via a power port, wherein the vehicle includes a rotating machine which is mechanically coupled to drive wheels, a main unit power inverter circuit which is operated to control power applied to the drive wheels by the rotating machine, an auxiliary unit which is an electric load, a storage unit which supplies electric power to the auxiliary unit, and an auxiliary unit power inverter circuit which is interposed between the auxiliary unit and the storage unit and is operated to control the auxiliary unit, the power supply apparatus comprising an electric power transferring electric path which connects the power port to the an auxiliary unit power inverter circuit.

According to the power supply apparatus, an auxiliary unit power inverter circuit is used when supplying electric power to the power supply unit or receiving electric power from the power supply unit via the power port. Hence, required durability of the main unit power inverter circuit can be prevented from becoming excessive due to the transfer of the electric power.

In the power supply apparatus, the storage unit is connected to input terminals of the main unit power inverter circuit.

Since the storage unit connected to the input terminals of the main unit power inverter circuit directly supplies electric power to the rotating machine or receives electric power from the rotating machine, the capacity of the storage unit is large. Hence, when transferring electric power between the storage unit and the power supply unit, large discharged electric power from the storage unit and charged electric power to the storage unit can be obtained as compared with the case where another storage means is used in the vehicle.

In the power supply apparatus, the auxiliary unit power inverter circuit includes a plurality of power inverter circuits connected to electric paths, which connect between the power supply unit and the power port, via the electric power transferring electric path.

The rated output of the auxiliary unit power inverter circuit is smaller than that of the main unit power inverter circuit. However, according to the power supply apparatus, since a plurality of power inverter circuits can be used which are connected to each other in parallel, the maximum value of electric energy can be increased which is transferred via the power port.

In the power supply apparatus, the auxiliary unit power inverter circuit includes a plurality pairs of serial connection units in which a high-electric-potential side switching element and a low-electric-potential side switching element are connected with each other in series, the serial connection units being connected to each other in parallel between electrodes of the storage unit, and the electric paths connecting between the power supply unit and the power port are respectively connected to connecting points of the switching elements each of which configures the serial connection unit of the auxiliary unit power inverter circuit.

The power supply apparatus further includes a first relay which opens and closes the electric power transferring electric path; a second relay which opens and closes between the auxiliary unit power inverter circuit and the auxiliary unit; a first switching control unit which closes the first relay and opens the second relay when electric power is supplied to the outside of the vehicle via the power port or received from the outside of the vehicle via the power port; and a second switching control unit which opens the first relay and closes the second relay when the auxiliary unit is driven.

When a power supply unit is connected to the power port while the power port and the auxiliary unit power inverter circuit are closed therebetween, unintended electric power can be transferred even when the auxiliary unit power inverter circuit and the like are not prepared to supply electric power to the power supply unit and receive electric power from the power supply unit. In addition, when supplying electric power to the power supply unit or receiving electric power from the power supply unit while the auxiliary unit power inverter circuit and the auxiliary unit are closed therebetween, the unintended electric power can be supplied to the auxiliary unit. Since the power supply apparatus includes the first relay, the second relay, the first switching control unit, and the second switching control unit, the above problems can be prevented.

In the power supply apparatus, when driving the auxiliary unit is required while electric power is transferred via the power port, the second relay is closed after the first relay is opened.

In the power supply apparatus, when transferring electric power via the power port is required while the auxiliary unit is driven, the first relay is closed after the second relay is opened.

In the power supply apparatus, the auxiliary unit power inverter circuit is a DC-AC converter circuit which includes a high-electric-potential side switching element which opens and closes between a terminal of the auxiliary unit and a positive electrode of the storage unit, and a low-electric-potential side switching element which opens and closes between a terminal of the auxiliary unit and a negative electrode of the storage unit, and the auxiliary unit power inverter circuit converts DC electric power of the storage unit to AC electric power and outputs the AC electric power to the auxiliary unit, and a reactor is provided between the power port and the connecting point between the high-electric-potential side switching element and the low-electric-potential side switching element.

According to the power supply apparatus, when supplying electric power to the storage unit, the energy stored in the reactor by turning on the low-electric-potential side switching element can be stored in the storage unit by turning off the low-electric-potential side switching element. In this case, the energy of the reactor may be supplied to the storage unit via the high-electric-potential side switching element. When a free wheel diode is connected to the high-electric-potential side switching element in antiparallel, the energy of the reactor may be supplied to the storage unit by using the free wheel diode.

In the power supply apparatus, the power port responds to both a single-phase power source and a three-phase power source. The power supply apparatus further includes a distinguishing unit which distinguishes between a single-phase power source and a three-phase power source.

Since the power supply apparatus includes the distinguishing unit, a suitable process can be conducted in both cases where the external single-phase power source is connected to the power port and where the external three-phase power source is connected to the power port.

The power supply apparatus further includes a first relay which opens and closes the electric power transferring electric path.

When a power supply unit is connected to the power port while the power port and the auxiliary unit power inverter circuit are closed therebetween, unintended electric power can be transferred or the auxiliary unit can be driven by being supplied with electric power, even when the auxiliary unit power inverter circuit and the like are not prepared to supply electric power to the power supply unit and receive electric power from the power supply unit. Since the power supply apparatus includes the first relay, the above problems can be prevented.

The power supply apparatus further includes a second relay which opens and closes between the auxiliary unit power inverter circuit and the auxiliary unit.

When supplying electric power to the power supply unit or receiving electric power from the power supply unit while the auxiliary unit power inverter circuit and the auxiliary unit are closed therebetween, the unintended electric power can be supplied to the auxiliary unit. Since the power supply apparatus includes the second relay, the above problems can be prevented.

In the power supply apparatus, a first maximum value of electric power, which passes through input terminals of the auxiliary unit power inverter circuit when supplying electric power to the power supply unit or receiving electric power from the power supply unit through the power port and the electric power transferring electric path, is larger than a second maximum value of electric power, which passes through the input terminals when the auxiliary unit is driven by using the auxiliary unit power inverter circuit connected to the electric power transferring electric path.

Since the power supply apparatus uses the auxiliary unit power inverter circuit when supplying electric power to the power supply unit and receiving electric power from the power supply unit via the power port, required durability of the main unit power inverter circuit can be prevented from becoming excessive due to the transfer of the electric power. Note that when the rated output of the auxiliary unit power inverter circuit is small, electric energy can be restricted when supplying electric power to the power supply unit and receiving electric power from the power supply unit. According to the power supply apparatus, by redundantly designing the auxiliary unit power inverter circuit so that electric power larger than that required for driving the auxiliary unit can be used, the above problem can be prevented.

In the power supply apparatus, a rated output of the auxiliary unit power inverter circuit is larger than a rated output of the auxiliary unit.

Since the rated output of the auxiliary unit is not required to be redundantly designed, manufacturing cost thereof can be prevented from increasing.

In the power supply apparatus, a rated output of the auxiliary unit power inverter circuit is smaller than a rated output of the main unit power inverter circuit.

In the power supply apparatus, the storage unit is connected to input terminals of the main unit power inverter circuit.

Since the storage unit connected to the input terminals of the main unit power inverter circuit directly supplies electric power to the rotating machine or receives electric power from the rotating machine, the capacity of the storage unit is large. Hence, when transferring electric power between the storage unit and the power supply unit, large discharged electric power from the storage unit and charged electric power to the storage unit can be obtained as compared with the case where another storage means is used in the vehicle.

In the power supply apparatus, the auxiliary unit power inverter circuit is configured with one power inverter circuit.

According to the power supply apparatus, the number of the electric power transferring electric paths and the like can be decreased compared with the case where a plurality of the auxiliary unit power inverter circuits are used.

It will be appreciated that the present invention is not limited to the configurations described above, but any and all modifications, variations or equivalents, which may occur to those who are skilled in the art, should be considered to fall within the scope of the present invention.

What is claimed is:

1. A power supply apparatus for a vehicle which supplies electric power to a power supply unit and charges electric power from the power supply unit to a main battery of an electric vehicle, a plug-in hybrid vehicle or a vehicle with electrically driven auxiliary units via a power port used for charging, wherein
    the vehicle includes a plurality of power inverter circuits which are connected to a common storage unit in parallel,
    the plurality of power inverter circuits include an electric power transferring power inverter circuit connected to the power port via an electric power transferring electric path, and are divided into a first category including the electric power transferring power inverter circuit and a second category,
    the power supply apparatus comprising a connection prohibiting unit which realizes a state in which the power inverter circuit included in the first category is electrically connected to the storage unit, and the power inverter circuit included in the second category is disconnected from the storage unit,
    the vehicle includes a rotating machine which is mechanically coupled to drive wheels, and one or more auxiliary electric loads,
    the plurality of power inverter circuits include a main unit power inverter circuit which is operated to control power applied to the drive wheels by the rotating machine, and at least one auxiliary unit power inverter circuit which is interposed between the one or more auxiliary electric loads and the storage unit and is operated to control the auxiliary unit,
    the electric power transferring power inverter circuit includes the auxiliary unit power inverter circuit,
    the main unit power inverter circuit is included in the second category,
    the connection prohibiting unit includes a first relay which opens and closes between an input terminal of the power inverter circuit included in the first category and the storage unit, and a second relay which opens and closes between an input terminal of the power inverter circuit included in the second category and the storage unit,
    the auxiliary unit power inverter circuits include at least one of the power inverter circuits included in the second category in addition to the electric power transferring power inverter circuit,
    each of the power inverter circuits included in the second category is connected to a capacitor at a side of the input terminal with respect to the second relay, and
    when the first relay is closed and the second relay is opened, each of the capacitors corresponding to the main unit power inverter circuit and the auxiliary unit power inverter circuit included in the second category is not charged from the electric power transferring electric path.

2. The power supply apparatus according to claim 1, wherein
    the first relay includes a first high-electric-potential side relay which opens and closes between the storage unit and a high-electric-potential side input terminal of the power inverter circuit included in the first category, and a first low-electric-potential side relay which opens and closes between the storage unit and a low-electric-potential side input terminal of the power inverter circuit included in the first category, and
    the second relay includes a second high-electric-potential side relay which opens and closes between the storage unit and a high-electric-potential side input terminal of the power inverter circuit included in the second category, and a second low-electric-potential side relay which opens and closes between the storage unit and a low-electric-potential side input terminal of the power inverter circuit included in the second category.

3. The power supply apparatus according to claim 2, wherein
    at least one of a first set of the first high-electric-potential side relay and the second high-electric-potential side relay and a second set of the first low-electric-potential side relay and the second low-electric-potential side relay is configured with the same member, thereby sharing the member with the power inverter circuit included in the first category and the power inverter circuit included in the second category.

4. The power supply apparatus according to claim 3, wherein
    a capacitor is connected to a pair of input terminals of the power inverter circuit included in the first category in parallel,
    a capacitor is connected to a pair of input terminals of the power inverter circuit included in the second category in parallel, and
    one of the first set and the second set, which is shared, includes a low-resistance relay and a high-resistance relay which respectively open and close a low-resistance path and a high-resistance path which connect between the storage unit and the input terminals of the power inverter circuit included in the first category and between the storage unit and the input terminals of the power inverter circuit included in the second category.

5. The power supply apparatus according to claim 1, wherein
    the power inverter circuit included in the first category is configured with only the electric power transferring power inverter circuit.

6. The power supply apparatus according to claim 1, wherein
the electric power transferring power inverter circuit includes a plurality of the auxiliary unit power inverter circuits connected to electric paths, which connect between the power supply unit and the power port, via the electric power transferring electric path.

7. A power supply apparatus for a vehicle which supplies electric power to a power supply unit and charges electric power from the power supply unit to a main battery of an electric vehicle, a plug-in hybrid vehicle or a vehicle with electrically driven auxiliary units via a power port used for charging, wherein
the vehicle includes a rotating machine which is mechanically coupled to drive wheels, a main unit power inverter circuit which is operated to control power applied to the drive wheels by the rotating machine, an auxiliary unit which is an electric load, a storage unit which supplies electric power to the auxiliary unit, and an auxiliary unit power inverter circuit which is interposed between the auxiliary unit and the storage unit and is operated to control the auxiliary unit,
the power supply apparatus comprises:
an electric power transferring electric path which connects the power port to the auxiliary unit power inverter circuit;
a first relay which opens and closes the electric power transferring electric path;
a second relay which opens and closes between the auxiliary unit power inverter circuit and the auxiliary unit;
a first switching control unit which closes the first relay and opens the second relay when electric power is supplied to an outside of the vehicle via the power port or received from the outside of the vehicle via the power port; and
a second switching control unit which opens the first relay and closes the second relay when the auxiliary unit is driven, and
when transferring electric power via the power port is required while the auxiliary unit is driven, the first switching control unit stops the auxiliary unit power inverter circuit, then waits until the auxiliary unit stops, and opens the second relay, and after the second relay is opened, the first switching control unit closes the first relay.

8. The power supply apparatus according to claim 7, wherein
the storage unit is connected to input terminals of the main unit power inverter circuit.

9. The power supply apparatus according to claim 7, wherein
the auxiliary unit power inverter circuit includes a plurality of power inverter circuits connected to electric paths, which connect between the power supply unit and the power port, via the electric power transferring electric path.

10. The power supply apparatus according to claim 9, wherein
the auxiliary unit power inverter circuit includes a plurality pairs of serial connection units in which a high-electric-potential side switching element and a low-electric-potential side switching element are connected with each other in series, the serial connection units being connected to each other in parallel between electrodes of the storage unit, and
the electric paths connecting between the power supply unit and the power port are respectively connected to connecting points of the switching elements each of which configures the serial connection unit of the auxiliary unit power inverter circuit.

11. The power supply apparatus according to claim 7, wherein
when driving the auxiliary unit is required while electric power is transferred via the power port, the second relay is closed after the first relay is opened.

12. The power supply apparatus according to claim 1, wherein
the auxiliary unit power inverter circuit is a DC-AC converter circuit which includes a high-electric-potential side switching element which opens and closes between a terminal of the auxiliary unit and a positive electrode of the storage unit, and a low-electric-potential side switching element which opens and closes between a terminal of the auxiliary unit and a negative electrode of the storage unit, and the auxiliary unit power inverter circuit converts DC electric power of the storage unit to AC electric power and outputs the AC electric power to the auxiliary unit, and
a reactor is provided between the power port and the connecting point between the high-electric-potential side switching element and the low-electric-potential side switching element.

13. The power supply apparatus according to claim 1, wherein
the power port responds to both a single-phase power source and a three-phase power source, and further comprising:
a distinguishing unit which distinguishes between the single-phase power source and the three-phase power source.

14. The power supply apparatus according to claim 7, further comprising a first relay which opens and closes the electric power transferring electric path.

15. The power supply apparatus according to claim 7, further comprising a second relay which opens and closes between the auxiliary unit power inverter circuit and the auxiliary unit.

16. The power supply apparatus according to claim 7, wherein
the auxiliary unit power inverter circuit is a DC-AC converter circuit which includes a high-electric-potential side switching element which opens and closes between a terminal of the auxiliary unit and a positive electrode of the storage unit, and a low-electric-potential side switching element which opens and closes between a terminal of the auxiliary unit and a negative electrode of the storage unit, and the auxiliary unit power inverter circuit converts DC electric power of the storage unit to AC electric power and outputs the AC electric power to the auxiliary unit, and
a reactor is provided between the power port and the connecting point between the high-electric-potential side switching element and the low-electric-potential side switching element.

17. The power supply apparatus according to claim 7, wherein
the power port responds to both a single-phase power source and a three-phase power source, and further comprising:
a distinguishing unit which distinguishes between the single-phase power source and the three-phase power source.

18. The power supply apparatus according to claim 7, wherein
- a first maximum value of electric power, which passes through input terminals of the auxiliary unit power inverter circuit when supplying electric power to the power supply unit or receiving electric power from the power supply unit through the power port and the electric power transferring electric path, is larger than a second maximum value of electric power, which passes through the input terminals when the auxiliary unit is driven by using the auxiliary unit power inverter circuit connected to the electric power transferring electric path.

19. The power supply apparatus according to claim 18, wherein a rated output of the auxiliary unit power inverter circuit is larger than a rated output of the auxiliary unit.

20. The power supply apparatus according to claim 18, wherein a rated output of the auxiliary unit power inverter circuit is smaller than a rated output of the main unit power inverter circuit.

21. The power supply apparatus according to claim 18, wherein the storage unit is connected to input terminals of the main unit power inverter circuit.

22. The power supply apparatus according to claim 18, wherein the auxiliary unit power inverter circuit is configured with one power inverter circuit.

* * * * *